US007003158B1

(12) United States Patent
Bennett et al.

(10) Patent No.: US 7,003,158 B1
(45) Date of Patent: Feb. 21, 2006

(54) HANDWRITING RECOGNITION WITH MIXTURES OF BAYESIAN NETWORKS

(75) Inventors: John Bennett, Sammamish, WA (US); David E. Heckerman, Bellevue, WA (US); Christopher A. Meek, Kirkland, WA (US); Bo Thiesson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 801 days.

(21) Appl. No.: 10/075,962

(22) Filed: Feb. 14, 2002

(51) Int. Cl.
*G06K 9/00* (2006.01)
(52) U.S. Cl. .................... 382/187; 382/159; 382/228
(58) Field of Classification Search ............... 382/159, 382/161, 181, 186, 187, 224, 229; 706/45, 706/46, 52; 704/251, 255, 2
See application file for complete search history.

(56) References Cited

U.S. PATENT DOCUMENTS

| | | | | |
|---|---|---|---|---|
| 5,737,724 | A * | 4/1998 | Atal et al. ................ | 704/251 |
| 5,764,797 | A | 6/1998 | Adcock .................... | 382/187 |
| 5,835,633 | A | 11/1998 | Fujisaki et al. ............ | 382/187 |
| 6,336,108 | B1 | 1/2002 | Thiesson et al. ........... | 706/20 |
| 6,807,537 | B1 | 10/2004 | Thiesson et al. ........... | 706/52 |

OTHER PUBLICATIONS

Luttrell "An adaptive bayesian network for low-level image processing", IEEE, pp. 61-65, 1993.*
Pan, et al. "Fuzzy bayesian networks-A general formalism for representation, inference and learning with hybrid bayesian networks", IEEE, pp. 401-406, 1999.*
Kumar, Shailesh, et al., "*A Bayesian Pairwise Classifier for Character Recognition*", pp. 1-9.
Cho, Sung J., et al. "*Analysis of Stroke Dependency Modeling in Bayesian Network Based On-Line Handwriting Recognition System*", pp. 1-9.
Cheung, Kwok-Wai., et al. "*A Bayesian Framework for Deformable Pattern Recognition with Application to Handwritten Character Recognition*", IEEE, Transactions on Pattern Analysis and Machine Intelligence, vol. 20, No. 12, Dec. 1998, pp. 1382-1388.
Byers, Simon D., et al., "*Bayesian Estimation and Segmentation of Spatial Point Processes using Voronoi Tilings*",Jul. 29, 1997, pp. 1-15.
Cheeseman, Peter, et al., *Bayesian Classification (AutoClass): Theory and Results*, 61-83.
Friedman, Nir, "*Bayesian Network Classifiers*", 1-37.
Bo Thiesson, et al., Learning Mixtures of DAG Models, Microsoft Research, May1998, 28 pages, Microsoft Corporation, Redmond, Washington.

\* cited by examiner

*Primary Examiner*—Daniel Miriam
(74) *Attorney, Agent, or Firm*—Amin & Turocy, LLP

(57) ABSTRACT

The invention performs handwriting recognition using mixtures of Bayesian networks. A mixture of Bayesian networks (MBN) consists of plural hypothesis-specific Bayesian networks (HSBNs) having possibly hidden and observed variables. A common external hidden variable is associated with the MBN, but is not included in any of the HSBNs. Each HSBN models the world under the hypothesis that the common external hidden variable is in a corresponding one of its states. The MBNs encode the probabilities of observing the sets of visual observations corresponding to a handwritten character. Each of the HSBNs encodes the probabilities of observing the sets of visual observations corresponding to a handwritten character and given a hidden common variable being in a particular state.

61 Claims, 22 Drawing Sheets

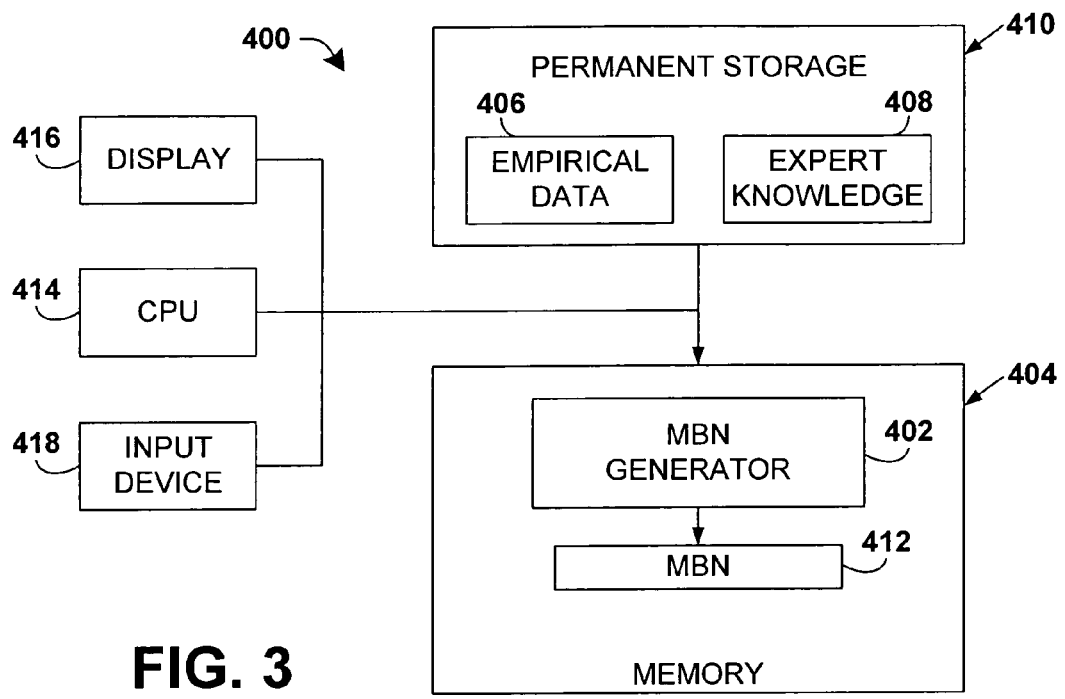
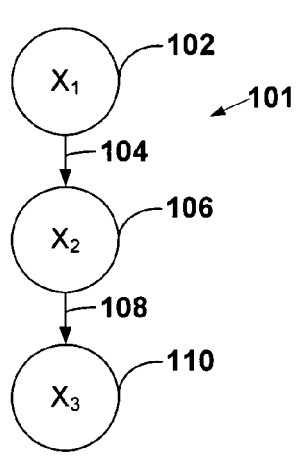
FIG. 1
PRIOR ART
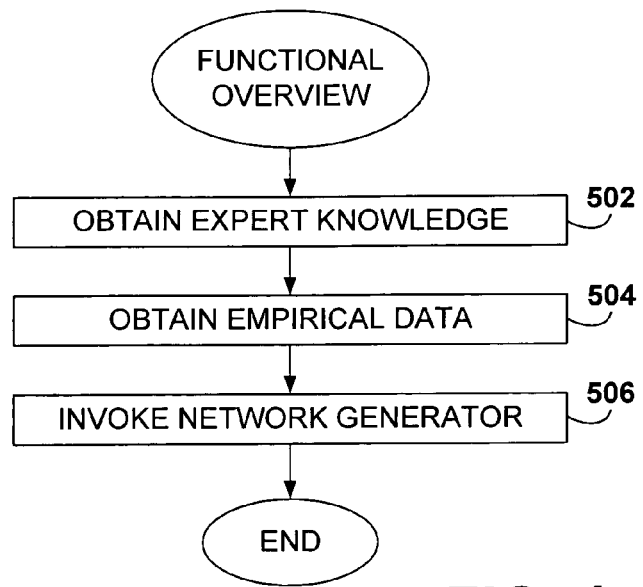
FIG. 4

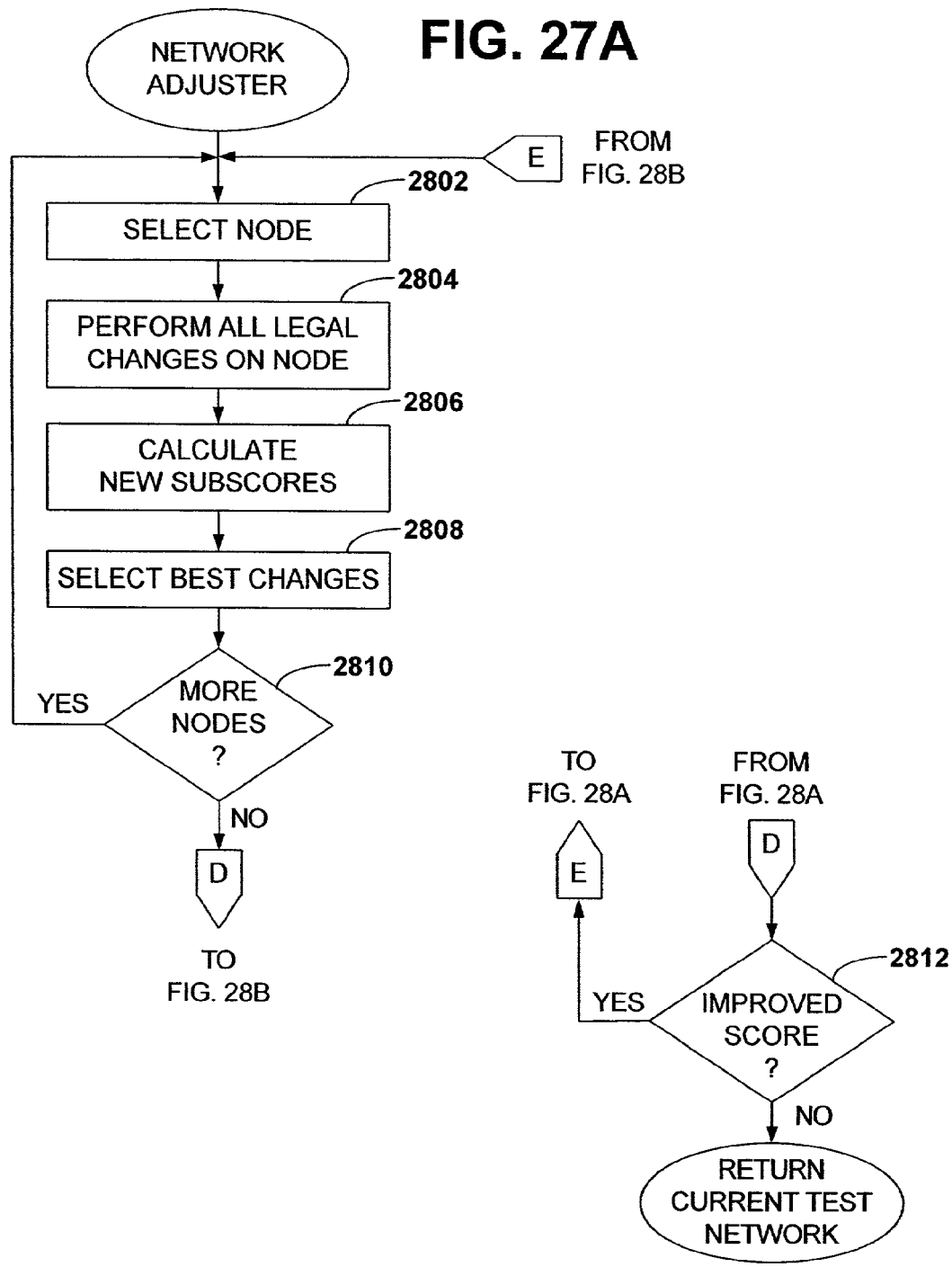

HANDWRITING RECOGNITION WITH MIXTURES OF BAYESIAN NETWORKS

CROSS-REFERENCE TO RELATED APPLICATION

This application is related to U.S. application Ser. No. 08/985,114 filed Dec. 4, 1997, U.S. Pat. No. 6,534,669 by Bo Thiesson et al., and entitled MIXTURES OF BAYESIAN NETWORKS, and to U.S. application Ser. No. 09/220,197 filed Dec. 23, 1998, U.S. Pat. No. 6,336,108 by Bo Thiesson et al., and entitled SPEECH RECOGNITION WITH MIXTURES OF BAYESIAN NETWORKS.

FIELD OF THE INVENTION

The present invention relates generally to data processing systems and, more particularly, to the generation and use of Bayesian networks for handwriting recognition.

BACKGROUND OF THE INVENTION

Various approaches have been developed to recognize patterns associated with handwritten characters. Most handwriting recognition systems use recognizers based on Neural Nets, Hidden Markov Models (HMM) or a K-Nearest-Neighbor (KNN) approach. These systems perform reasonably well at the task of classifying characters based on their total appearance. For example, a level of similarity can be determined by generating a distance measure between patterns.

The advent of artificial intelligence within computer science has brought an abundance of decision-support systems. Decision-support systems are computer systems in which decisions, typically rendered by humans, are recommended and sometimes made. In creating decision-support systems, computer scientists seek to provide decisions with the greatest possible accuracy. Thus, computer scientists strive to create decision-support systems that are equivalent to or more accurate than a human expert. Applications of decision-support systems include medical diagnosis, troubleshooting computer networks, or other systems wherein a decision is based upon identifiable criteria.

One of the most promising new areas for research in decision-support systems is Bayesian networks. A Bayesian network is a representation of the probabilistic relationships among distinctions about the world. Each distinction, sometimes called a variable, can take on one of a mutually exclusive and exhaustive set of possible states. A Bayesian network is expressed as an acyclic-directed graph where the variables correspond to nodes and the relationships between the nodes correspond to arcs.

FIG. 1 depicts an example of a Bayesian network 101. In FIG. 1 there are three variables, $X_1$, $X_2$, and $X_3$, which are represented by nodes 102, 106 and 110, respectively. This Bayesian network contains two arcs 104 and 108. Associated with each variable in a Bayesian network is a set of probability distributions. Using conditional probability notation, the set of probability distributions for a variable can be denoted by $p(x_i|\Pi_i, \xi)$, where "p" refers to the probability distribution, where "$\Pi_i$" denotes the parents of variable $X_i$ and where "$\xi$" denotes the knowledge of the expert. The Greek letter "$\xi$" indicates that the Bayesian network reflects the knowledge of an expert in a given field. Thus, this expression reads as follows: the probability distribution for variable $X_i$ given the parents of $X_i$ and the knowledge of the expert. For example, $X_1$ is the parent of $X_2$. The probability distributions specify the strength of the relationships between variables. For instance, if $X_1$ has two states (true and false), then associated with $X_1$ is a single probability distribution $p(x_1|\xi)$ and associated with $X_2$ are two probability distributions $p(x_2|x_1=t, \xi)$ and $p(x_2|x_1=f, \xi)$. In the remainder of this specification, $\xi$ is not specifically mentioned.

The arcs in a Bayesian network convey dependence between nodes. When there is an arc between two nodes, the probability distribution of the first node depends upon the value of the second node when the direction of the arc points from the second node to the first node. For example, node 106 depends upon node 102. Therefore, nodes 102 and 106 are said to be conditionally dependent. Missing arcs in a Bayesian network convey conditional independencies. For example, node 102 and node 110 are conditionally independent given node 106. However, two variables indirectly connected through intermediate variables are conditionally dependent given lack of knowledge of the values ("states") of the intermediate variables. Therefore, if the value for node 106 is known, node 102 and node 110 are conditionally dependent.

In other words, sets of variables X and Y are said to be conditionally independent, given a set of variables Z, if the probability distribution for X given Z does not depend on Y. If Z is empty, however, X and Y are said to be "independent" as opposed to conditionally independent. If X and Y are not conditionally independent, given Z, then X and Y are said to be conditionally dependent given Z.

The variables used for each node may be of different types. Specifically, variables may be of two types: discrete or continuous. A discrete variable is a variable that has a finite or countable number of states, whereas a continuous variable is a variable that has an uncountably infinite number of states. All discrete variables considered in this specification have a finite number of states. An example of a discrete variable is a Boolean variable. Such a variable can assume only one of two states: "true" or "false." An example of a continuous variable is a variable that may assume any real value between −1 and 1. Discrete variables have an associated probability distribution. Continuous variables, however, have an associated probability density function ("density"). Where an event is a set of possible outcomes, the density p(x) for a variable "x" and events "a" and "b" is defined as:

$$p(x) = \operatorname*{Lim}_{a \to b}\left[\frac{p(a \le x \le b)}{|(a-b)|}\right]$$

where $p(a \le x \le b)$ is the probability that x lies between a and b.

FIG. 2 depicts an example Bayesian network for troubleshooting automobile problems. The Bayesian network of FIG. 2 contains many variables 202, 204, 206, 208, 210, 212, 214, 216, 218, 220, 222, 224, 226, 228, 230, 232, and 234, relating to whether an automobile will work properly, and arcs 236, 238, 240, 242, 244, 246, 248, 250, 252, 254, 256, 258, 260, 262, 264, 268. A few examples of the relationships between the variables follow. For the radio 214 to work properly, there must be battery power 212 (arc 246). Battery power 212, in turn, depends upon the battery working properly 208 and a charge 210 (arcs 242 and 244). The battery working properly 208 depends upon the battery age 202 (arc 236). The charge 210 of the battery depends upon the alternator 204 working properly (arc 238) and the fan belt 206 being intact (arc 240). The battery age variable 202, whose values lie from zero to infinity, is an example of a continuous variable that can contain an infinite number of values. However, the battery variable 208 reflecting the correct operations of the battery is a discrete variable being either true or false.

The automobile troubleshooting Bayesian network also provides a number of examples of conditional independence and conditional dependence. The nodes operation of the lights 216 and battery power 212 are dependent, and the nodes operation of the lights 216 and operation of the radio 214 are conditionally independent given battery power 212. However, the operation of the radio 214 and the operation of the lights 216 are conditionally dependent. The concept of conditional dependence and conditional independence can be expressed using conditional probability notation. For example, the operation of the lights 216 is conditionally dependent on battery power 212 and conditionally independent of the radio 214 given the battery power 212. Therefore, the probability of the lights working properly 216 given both the battery power 212 and the radio 214 is equivalent to the probability of the lights working properly given the battery power alone, P(Lights|Battery Power, Radio)=P(Lights|Battery Power). An example of a conditional dependence relationship is the probability of the lights working properly 216 given the battery power 212 which is not equivalent to the probability of the lights working properly given no information. That is, p(Lights|Battery Power)≠p(Lights).

There are two conventional approaches for constructing Bayesian networks. Using the first approach ("the knowledge-based approach"), a person known as a knowledge engineer interviews an expert in a given field to obtain the knowledge of the expert about the field of expertise of the expert. The knowledge engineer and expert first determine the distinctions of the world that are important for decision making in the field of the expert. These distinctions correspond to the variables of the domain of the Bayesian network. The "domain" of a Bayesian network is the set of all variables in the Bayesian network. The knowledge engineer and the expert next determine the dependencies among the variables (the arcs) and the probability distributions that quantify the strengths of the dependencies.

In the second approach ("called the data-based approach"), the knowledge engineer and the expert first determine the variables of the domain. Next, data is accumulated for those variables, and an algorithm is applied that creates a Bayesian network from this data. The accumulated data comes from real world instances of the domain. That is, real world instances of decision making in a given field. Conventionally, this second approach exists for domains containing only discrete variables.

After the Bayesian network has been created, the Bayesian network becomes the engine for a decision-support system. The Bayesian network is converted into a computer-readable form, such as a file and input into a computer system. Then, the computer system uses the Bayesian network to determine the probabilities of variable states given observations, determine the benefits of performing tests, and ultimately recommend or render a decision. Consider an example where a decision-support system uses the Bayesian network of FIG. 2 to troubleshoot automobile problems. If the engine for an automobile did not start, the decision-based system could request an observation of whether there was gas 224, whether the fuel pump 226 was in working order by possibly performing a test, whether the fuel line 228 was obstructed, whether the distributor 230 was working, and whether the spark plugs 232 were working. While the observations and tests are being performed, the Bayesian network assists in determining which variable should be observed next.

By utilizing both expert knowledge and empirical data, the network generator provides an improved Bayesian network that is more accurate than conventional Bayesian networks. In addition, the exemplary embodiment facilitates the use of continuous variables in Bayesian networks and handles missing data in the empirical data that is used to construct Bayesian networks.

Expert knowledge consists of two components: an equivalent sample size or sizes ("sample size"), and the prior probabilities of all possible Bayesian-network structures ("priors on structures"). The effective sample size is the effective number of times that the expert has rendered a specific decision. For example, a doctor with 20 years of experience diagnosing a specific illness may have an effective sample size in the hundreds. The priors on structures refers to the confidence of the expert that there is a relationship between variables (e.g., the expert is 70 percent sure that two variables are related). The priors on structures can be decomposed for each variable-parent pair known as the "prior probability" of the variable-parent pair. Empirical data is typically stored in a database. An example of acquiring empirical data can be given relative to the Bayesian network of FIG. 2. If, at a service station, a log is maintained for all automobiles brought in for repair, the log constitutes empirical data. The log entry for each automobile may contain a list of the observed state of some or all of the variables in the Bayesian network. Each log entry constitutes a case. When one or more variables are unobserved in a case, the case containing the unobserved variable is said to have "missing data." Thus, missing data refers to when there are cases in the empirical data database that contain no observed value for one or more of the variables in the domain. An assignment of one state to each variable in a set of variables is called an "instance" of that set of variables. Thus, a "case" is an instance of the domain. The "database" is the collection of all cases.

An example of a case can more clearly be described relative to the Bayesian network of FIG. 2. A case may consist of the battery age 202 being 2.132 years old, the battery working properly 208 being true, the alternator working properly 204 being true, the fan belt being intact 206 being true, the charge 210 being sufficient, the battery power 212 being sufficient, the starter working properly 220 being true, the engine turning over 218 being true, the amount of gas 224 being equal to 5.3 gallons, the fuel pump working properly 226 being true, the fuel line working properly 228 being true, the distributor working properly 230 being false, the spark plugs working properly 232 being true and the engine starting 234 being false. In addition, the variables for the gas gauge 222, the radio working properly 214 and the lights working properly 216 may be unobserved. Thus, the above-described case contains missing data.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides a system and method to perform handwriting recognition using mixtures of Bayesian networks. A mixture of Bayesian networks (MBN) includes plural hypothesis-specific Bayesian networks (HSBNs) having possibly hidden and observed variables. A common external hidden variable is associated with the MBN, but is not included in any of the HSBNs. The number of HSBNs in the MBN corresponds to the number of states of the common external hidden variable, and each HSBN models the world under the hypothesis that the common external hidden variable is in a corresponding one of those states.

In accordance with an aspect of the present invention, the MBNs encode the probabilities of observing the sets of visual observations corresponding to a handwritten character (e.g., input ink). The HSBNs encode the probabilities of observing the sets of visual observations corresponding to the handwritten character and given a hidden common variable being in a particular state. Each HSBN has one or more nodes corresponding to the attributes of features of the visual observations. These nodes store probability parameters corresponding to the probabilities with causal links representing dependencies between nodes in each HSBN.

In accordance with an aspect of the present invention, the MBNs can be trained by conducting a parameter search for a set of changes in the probability parameters which improves the goodness of each HSBN in predicting the observed data (e.g., handwritten characters), and then modifying the probability parameters of each HSBN accordingly. Then, for each HSBN, a structure score is computed reflecting the goodness of the HSBN in predicting the observed data. A structure search is conducted for a change in the causal links that improves the structure search score, and the causal links of each HSBN are adjusted accordingly. The MBN structure is initialized as a collection of identical HSBNs whose discrete hidden variables are connected to all observed variables and whose continuous hidden variables are connected only to each of the continuous observed variables, the directionality being from hidden variable to observed variable. To facilitate training of the MBN, the parameter searching and modifications can be interleaved with the structure searching and modifications.

In constructing the MBN, the parameters of the current HSBNs are improved using, for example, an Expectation-Maximization (EM) process applied for training data. The EM process is iterated to improve the network performance in predicting the training data, until some criteria has been met. Early in the process, for example, the criteria may be a fixed number of iterations which may itself be a function of the number of times the overall learning process has iterated. Later in the process, the criteria can be convergence of the parameters to a near optimum network performance level.

Then, expected complete-model sufficient statistics are generated from the training data. After computation of the expected complete-model sufficient statistics for the MBN, the structures of the HSBNs are searched for changes which improve the HSBN's score or performance in predicting the training data given the current parameters. The MBN score can be determined by the HSBN scores, the score for the common hidden external variable, and a correction factor. If the structure of any HSBN changes as a result of this fast search, the prior steps can be repeated. The foregoing is iteratively repeated until the network structure stabilizes, such as based on the MBN score. At this point the current forms of the HSBNs are saved as the MBN for the class variable. An MBN is thus generated for each possible combination of number of states of the hidden discrete variables, including the common external hidden variable, so that a number of MBNs is produced in accordance with the number of combinations of numbers of states of the hidden discrete variables.

BRIEF DESCRIPTION OF THE DRAWINGS

FIG. 1 depicts an example of a conventional Bayesian network.

FIG. 3 depicts an example of a Bayesian network implemented in a computer system in accordance with an aspect of the present invention.

FIG. 4 depicts an overview of functionality performed by a Bayesian network generator in accordance with an aspect of the present invention.

FIGS. 27A and 27B depict a flow diagram for scoring and adjusting a network in accordance with an aspect of the present invention.

DETAILED DESCRIPTION OF THE INVENTION

Overview

Figure 2:
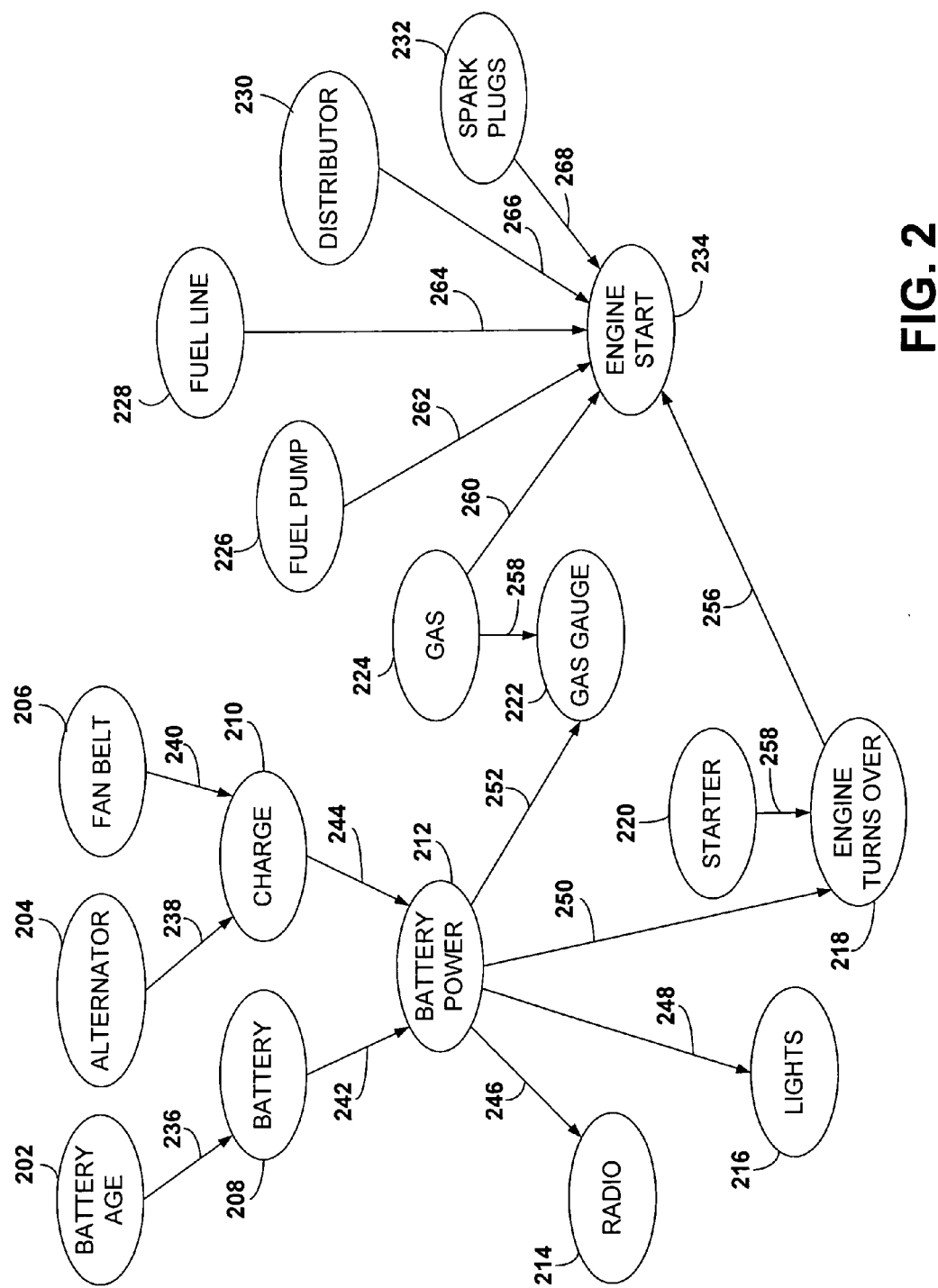
FIG. 2 depicts an example conventional Bayesian network for troubleshooting automobile problems.

The present invention generally relates to systems and methods to facilitate recognition of handwritten characters. In particular, Mixtures of Bayesian Networks (MBNs) encode the probabilities of the visual observations associated with a handwritten character. Each of the MBNs is associated with a common hidden variable, which can be an external common hidden variable having a predetermined number of discrete states. Each of the MBNs consists of a plurality of hypothesis-specific Bayesian networks (HSBNs) that model a hypothesis that the common hidden variable corresponding to a handwritten character is in a respective one of its states.

Introduction to Mixtures of Bayesian Networks

FIG. 3 depicts an example of an MBN generator 402 implemented in a computer system 400 in accordance with an aspect of the present invention. The MBN generator 402 is illustrated as residing within a memory 404 and receives empirical data 406 and expert knowledge 408 as input. The expert knowledge 408 typically comprises a sample size, and the priors on structures for sample handwritten characters and visual patterns thereof. Both the empirical data 406 and the expert knowledge 408 reside in a permanent storage device 410. The empirical data 406 is typically comprised of cases stored in a database ("the empirical data database"). In response to receiving both the empirical data 406 and the expert knowledge 408, the MBN generator 402 generates an MBN 412 in accordance with an aspect of the present invention. In the system 400, the memory 404 and permanent storage 410 are connected to a central processing unit 414, a display 416 which may be a video display, and an input device 418.

The MBN generator 402 can be programmed and/or configured to implement prediction tasks and clustering tasks. A database of observed cases of handwriting characters over a set of variables is given. The prediction problem is to learn the statistical relationships among those variables for prediction. The clustering problem is to group the rows of the database into groups so that groups of similar users can be discovered and properties of the groups can be presented. The MBN generator 402 provides a flexible and rich class of models (for both of these problems) and provides algorithms to learn which model from this class of models best fits the data. The class of models employed in accordance with an aspect of the present invention is called a mixture of Bayesian networks (MBN). The processes for learning MBNs include several advantageous features including: (a) interleaving parameter and structural search, (b) expected complete model sufficient statistics, and (c) an outer loop for determining the number of states of the discrete hidden variables.

An analyzer 420 can be programmed and/or configured to infer a given input character (or characters) based on the MBN 412.

FIG. 4 depicts a functional overview of the MBN generator of an exemplary embodiment. In order to use the MBN generator of the exemplary embodiment, a knowledge engineer first obtains expert knowledge at 502, such as from an expert in a given field. This expert knowledge includes one or more sample sizes and structure priors which includes the expert's prior probability that C has |C| states, p |C| and the expert's prior probability for each HSBN structure given c and $p(B_S^e || C)$. The knowledge engineer then obtains empirical data at 504 from real world invocations of decision making in the given field. After obtaining the expert knowledge and the empirical data, the knowledge engineer invokes the network generator at 506 to create an improved MBN that can then be used as the basis for a decision-support. Prior to generating the MBN, a set of features can be derived from the input characters for use in constructing the MBNs. Although the functionality at 502 has been described as occurring before 504, one skilled in the art will appreciate that step 504 may occur before step 502.

Figure 5:
FIG. 5 depicts an example of a Bayesian network consisting of a mixture of Bayesian networks in accordance with the invention.

FIG. 5 illustrates a graphical model of a mixture of Bayesian networks in accordance with an aspect of the present invention. C, the class variable (e.g., representing a handwritten character), is a discrete variable, that is not observed, O is a set of observed variables and H is a set of unobserved (hidden) variables.

Figure 6:
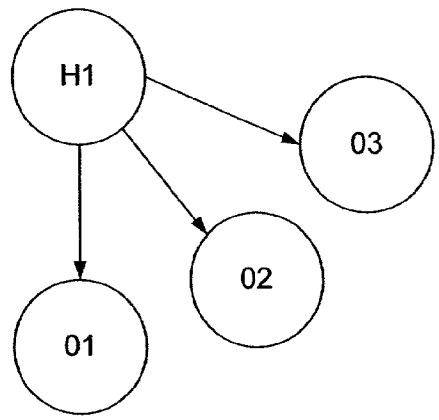
FIG. 6 depicts an example of a hypothesis-specific Bayesian network in the mixture of Bayesian networks of FIG. 5.
Figure 7:
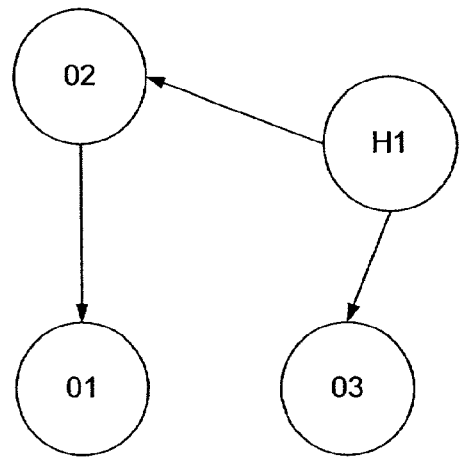
FIG. 7 depicts another example of a hypothesis-specific Bayesian network in the mixture of Bayesian networks of FIG. 5.

As one example, C can have two possible values. In this case, the conditional distribution of sets of variables O and H given C=0 might be represented by a Bayesian network, such as shown in FIG. 6, and the conditional distribution of sets of variables O and H given C=1 shown in FIG. 7. Both sets of variables O and H can contain a combination of discrete and continuous variables. A restriction exists to require that no continuous variable point at a discrete variable in any of the Bayesian networks. Given a database of observations for the variables in O, the goal is to select the number of values for the class C (e.g., |C|), the parameters $\theta_c$ (that describe the percentage of the database attributed to the $c^{th}$ Bayesian network), and the |C| Bayesian network structures and their parameters.

A naïve method for learning a single Bayesian network with hidden variables is to (1) fix the structure of the Bayesian network (2), use the expectation maximization (EM) algorithm to find good (e.g., ML or MAP) parameter values for the Bayesian network, and (3) use the parameters obtained from step 2 to compute a score for the model, such as by using the Cheeseman-Stutz, BIC or other approximation of the posterior probability for the model. There are two difficulties with this approach. First, the EM algorithm is an iterative algorithm that can be too computationally expensive to run on many models. Second, the approximate scores for models with hidden variables (C and H in the case of a mixture of Bayesian networks) usually do not factor into scores for individual nodes. If it did factor, one could use previously calculated scores to make search more efficient.

These and other deficiencies can be solved in by interleaving the EM algorithm's search for parameters with a search for the structure of the Bayesian networks in accor dance with an aspect of the present invention. By interleaving the search for Bayesian networks and the search for parameters, scores are created that factor according to the model and thus allows for efficient search of model structure. In addition, a method according to an aspect of the invention can independently search for each of the Bayesian networks in the mixture of Bayesian networks.

Let $H_c$ and $O_c$ be continuous variables (denoted by $\Gamma\_1$ to $\Gamma\_nc$ and use $\gamma\_1$ to $\gamma\_nc$ to denote values for these variables) and let C, $H_d$ and $O_d$ be discrete variables (denoted by $\Delta\_1$ to $\Delta\_nd$ and use $\delta\_1$ to $\delta\_nd$ to denote values for these variables) where nc is the number of continuous variables and nd is the number of discrete variables. Let $\Gamma$ denote the set of all of the continuous variables and $\Delta$ denote the set of all of the discrete variables. $\gamma$ to denotes a vector of values for the variables in $\Gamma$ and $\delta$ is an index to a configuration of the discrete variables $\Delta$. Let $y_{case}$ be the configuration of the observed variables O in a particular case, and let $x_{case}$ be a complete configuration of C, H and O. A key idea according to an aspect of the present invention is a concept called complete model sufficient statistics. The complete model sufficient statistics for a complete case is a vector $T(x_{case})$. This vector is defined as follows:

$$T(x_{case}) = <<N\_1, R\_1, S\_1>, \ldots, <N\_m, R\_m, S\_m>>$$

From the foregoing definition, the vector $T(x_{case})$ consists of m triples, where m is the number of possible discrete configurations for the discrete variables $\Delta$. Suppose the discrete variables in $x_{case}$ takes on the $i^{th}$ configuration. The entries $N\_j$ ($j<>i$) are zero. The $R\_j$ are vectors of length nc and the $S\_j$ are square matrices of size nc×nc. The $R\_j=0$ if $j<>i$ and $R\_i=\gamma$ otherwise. The $S\_j=0$ if $j<>i$ and $S\_i=\gamma'*\gamma$ otherwise (where $\gamma'$ is the transpose of $\gamma$). (Note that a boldface zero, e.g., 0 denotes either a zero vector or matrix.)

Example Involving Complete Data

The following is a working example in which a complete database with 2 cases is given as:

| O1 | O2 | O3 | H1 | C |
|---|---|---|---|---|
| 5.1 | 10 | 0 | 1 | 1 |
| 2.7 | 9 | 0 | 0 | 0 |

The variables O1 and O2 are continuous. The remaining variables are discrete.

According to an aspect of the invention, all possible configurations of the discrete variables are indexed in some fixed way, an example of which is given in the table below:

| $\Delta$ | C | H1 | O3 |
|---|---|---|---|
| 1 | 0 | 0 | 0 |
| 2 | 0 | 0 | 1 |
| 3 | 0 | 1 | 0 |
| 4 | 0 | 1 | 1 |
| 5 | 1 | 0 | 0 |
| 6 | 1 | 0 | 1 |
| 7 | 1 | 1 | 0 |
| 8 | 1 | 1 | 1 |

From the foregoing tables, the complete model statistics vector for case 1 is:

$$T(case\,1) = \left\langle \langle 0,0,0\rangle, \langle 0,0,0\rangle, \langle 0,0,0\rangle, \langle 0,0,0\rangle, \right.$$
$$\left. \langle 0,0,0\rangle, \langle 0,0,0\rangle, \left\langle 1, \begin{bmatrix}5.1\\10\end{bmatrix}, \begin{bmatrix}26.01 & 51\\51 & 100\end{bmatrix} \right\rangle, \langle 0,0,0\rangle \right\rangle$$

The complete model statistics vector for case 2 is:

$$T(case\,2) = \left\langle \left\langle 1, \begin{bmatrix}2.7\\9\end{bmatrix}, \begin{bmatrix}7.29 & 24.3\\24.3 & 81\end{bmatrix} \right\rangle, \langle 0,0,0\rangle, \right.$$
$$\left. \langle 0,0,0\rangle, \langle 0,0,0\rangle, \langle 0,0,0\rangle, \langle 0,0,0\rangle, \langle 0,0,0\rangle, \langle 0,0,0\rangle \right\rangle$$

The expected complete model sufficient statistics is a vector ECMSS where $$ECMSS = \sum_{case=1}^{I} E(T(X_{case})|y_{case}, \theta, S)$$

The expectation of $T(x_{case})$ is computed by performing inference in a Bayesian network using conventional techniques well known to those skilled in the art. The sum of $T(x_1)$ and $T(x_2)$ is simply scalar, vector, or matrix addition (as appropriate) in each coordinate of the vector.

Example Involving Incomplete Data

The following is a working example in which an incomplete database is given. The incomplete data base is given in the following table, in which the variables O1 and O2 are continuous and O3, H1, and C are binary discrete and the symbol "?" denotes unknown data:

| O1 | O2 | O3 | H1 | C |
|---|---|---|---|---|
| 5.1 | 10 | 0 | ? | ? |
| 2.7 | 9 | 0 | ? | ? |

The vectors $T(x_{case})$ for each case are readily inferred from the foregoing table in accordance with the definition of $T(x_{case})$ as follows:

$$T(case\,1) = \left\langle \left\langle P(\Delta=1|y_1), P(\Delta=1|y_1)\begin{bmatrix}5.1\\10\end{bmatrix}, P(\Delta=1|y_1)\begin{bmatrix}26.01 & 51\\51 & 100\end{bmatrix} \right\rangle, \right.$$
$$\ldots, \left\langle P(\Delta=m|y_1), P(\Delta=m|y_1)\begin{bmatrix}5.1\\10\end{bmatrix}, \right.$$
$$\left.\left. P(\Delta=m|y_1)\begin{bmatrix}26.01 & 51\\51 & 100\end{bmatrix} \right\rangle \right\rangle$$

$$T(case\,2) = \left\langle \left\langle P(\Delta=1|y_2), P(\Delta=1|y_2)\begin{bmatrix}2.7\\9\end{bmatrix}, P(\Delta=1|y_2)\begin{bmatrix}7.29 & 24.3\\24.3 & 81\end{bmatrix} \right\rangle, \right.$$
$$\ldots, \left\langle P(\Delta=m|y_2), P(\Delta=m|y_2)\begin{bmatrix}2.7\\9\end{bmatrix}, \right.$$
$$\left.\left. P(\Delta=m|y_2)\begin{bmatrix}7.29 & 24.3\\24.3 & 81\end{bmatrix} \right\rangle \right\rangle$$

In accordance with an aspect of the present invention, the expected complete model sufficient statistics can be employed as complete model sufficient statistics to perform searching among alternative Bayesian networks, such as using the methods described below. One way to do this is to form the expected complete model sufficient statistics for each value of C.

Hence, for each value of C, the expected complete model sufficient statistics for O and H is formed, which is denoted ECMSS_c. The expected complete model sufficient statistics for O and H can then be used for searching for Bayesian networks. Since the expected complete model sufficient statistics for each value of C are distinct (and we have assumed parameter independence) the statistics for each value of C can be used to search for the respective Bayesian network independently of other Bayesian networks. By creating the complete model sufficient statistics (in essence) new scores are created that factor according to the Bayesian networks, as discussed herein.

For instance, let the indexing of the discrete configurations be as described in the table below.

| Δ | C | H1 | O3 |
|---|---|----|----|
| 1 | 0 | 0  | 0  |
| 2 | 0 | 0  | 1  |
| 3 | 0 | 1  | 0  |
| 4 | 0 | 1  | 1  |
| 5 | 1 | 0  | 0  |
| 6 | 1 | 0  | 1  |
| 7 | 1 | 1  | 0  |
| 8 | 1 | 1  | 1  |

Using the index Δ, ECMSS_j is derived from ECMSS by selecting the appropriate triples from ECMSS. For this index we would have ECMSS_0=<triple_1,triple_2,triple_3,triple_4>

ECMSS_1=<triple_5,triple_6,triple_7,triple_8>

In this case, the triple_j is the triple <N_j,R_j,S_j> from ECMSS. Specifically, for example, triple_1 is:

$$\left\langle P(\Delta = 1|y_2) + P(\Delta = 1|y_1), P(\Delta = 1|y_2)\begin{bmatrix}2.7\\9\end{bmatrix} + P(\Delta = 1|y_1)\begin{bmatrix}5.1\\10\end{bmatrix},\right.$$

$$\left.P(\Delta = 1|y_2)\begin{bmatrix}7.29 & 24.3\\24.3 & 81\end{bmatrix} + P(\Delta = 1|y_1)\begin{bmatrix}26.01 & 51\\51 & 100\end{bmatrix}\right\rangle =$$

$$\left\langle P(\Delta = 1|y_2) + P(\Delta = 1|y_1), \begin{bmatrix}2.7 \times P(\Delta = 1|y_2) + 5.1 \times P(\Delta = 1|y_1)\\9 \times P(\Delta = 1|y_2) + 10 \times P(\Delta = 1|y_1)\end{bmatrix},\right.$$

$$\left.\begin{bmatrix}7.29 \times P(\Delta = 1|y_2) + 26.01 \times P(\Delta = 1|y_1) & 24.3 \times P(\Delta = 1|y_2) + 51 \times P(\Delta = 1|y_1)\\24.3 \times P(\Delta = 1|y_2) + 51 \times P(\Delta = 1|y_1) & 81 \times P(\Delta = 1|y_2) + 100 \times P(\Delta = 1|y_1)\end{bmatrix}\right\rangle$$

From the foregoing, a general process for learning a mixture of Bayesian networks (MBN) in accordance with an aspect of the invention is as follows:

1. Choose the number of possible states for the variables C and Hd.
2. Initialize a hypothesis-specific Bayesian-network structure for each hypothetical value of C to be a graph in which each variable in H points to each variable in O—except for the restriction that no continuous variable may point to a discrete variable—and in which there are no additional arcs. Choose initial values for the parameters in each of these hypothesis-specific Bayesian networks. The parameter values can be set at random, with agglomerative methods, marginal+noise, or other methods. Choose values for the parameters θc, e.g., choose them to be uniform.

The marginal+noise initialization method can be implemented as follows: Take the initial MBNs, which is a Bayesian network with discrete hidden variables. Remove all hidden nodes and adjacent arcs and adjust the local distributions, creating model $s_i$ (a submodel induced by the non-hidden variables). Data is complete with respect to $s_i$. Compute MAP parameter values for $s_i$ (or a model that encodes more independencies than $s_i$). Those practiced in the art will recognize that this step can be performed in closed form assuming conjugate priors are used. Create a conjugate distribution for the parameters of $s_i$, $\theta_i$, whose MAP parameters agree with the MAP parameters just computed and whose equivalent sample size is specified by the user. This sample size may be different than the one(s) used to determine the parameter priors. Next, for each non-hidden node X in s and for each configuration of X's hidden parents, initialize the parameters of the local distributions $p(x|\Pi_x,\theta_s,s)$ by drawing from the distribution for $\theta_i$ just described. For each hidden node H in s and for each configuration of H's (possible) parents, initialize H's multinomial parameters to be some fixed distribution (e.g., uniform). Alternatively, initialize by sampling from a Dirichlet distribution specified by the user. Those practiced in the art will recognize that this initialization method can be applied to any parameter optimization algorithm that requires an initial seed (e.g., MCMC, simulated annealing, EM, gradient ascent, conjugate gradient, Newton-Raphson, and quasi-Newton).

3. Use the EM algorithm to do one E step and one M step to improve the parameter estimates for the current model.
4. If some convergence criterion is not satisfied then go to step 3.
5. Using the current MBN, create the expected complete-model sufficient statistics ECMSS and ECMSS_c for each hypothesis-specific Bayes net corresponding to C=c. For every C=c, translate ECMSS_c to expected sufficient statistics $N_{ijk}$, sample mean, scatter matrix, and sample size (for use in the structure search step that follows). Those practiced in the art will recognize that this step can be performed with standard techniques.
6. Using the expected complete model sufficient statistics for each value of C, search for structures that improve the score. The result is a new network structures with new parameter values.
7. If some Convergence criterion is not satisfied then go to step 3.

8. Save the model that is selected. Choose another number of possible states for the variable C and Hd. Go to step 2. Repeat this step and compare the models that are selected. Use the corrected version of the Cheeseman-Stutz score.

The choice in step 4 of whether to go to step 3 or step 5 can be decided in a variety of ways, e.g., by checking the convergence of the likelihood, by limiting the number of iterations allowed, and so forth. There are various modifications of this process that are useful, including having the process adaptively prune out hypothesis-specific Bayesian networks for which θc (the support for the HSBN corresponding to C=c) falls below some threshold (e.g., 1/N).

The following is a description of different modes of the foregoing process.

$((EM)^{\#}ES*M)*$:

In this mode of the process, the EM step is iteratively repeated (steps 3 and 4) a limited number (#) of times while the remainder of the process including the search for optimum structure is carried out to convergence.

$((EM)*ES*M)*$:

In this mode of the process, the EM steps are iterated until convergence before performing the remainder of the algorithm and the structure search is also carried to convergence.

$((EM)^{\#(iteration)}ES*M)*$

In this version of the process, the iteration of the EM step (steps 3 and 4) is carried out over a limited number (#) of iterations which is a function of the number of iterations of the structure search step (step 6).

$((EM)^{\#}ES^{\#}M)*$:

In this version of the process, the number of iterations of the EM step is a fixed number, the number of iterations of the structure search step is a fixed (possibly different) number.

$((EM)*ES^{\#}M)*$

In this version of the process, the EM steps are always iterated to convergence, while the structure search is iterated a limited number of times.

$((EM)^{\#(iteration)}ES^{\#}M)*$

In this version of the process, the number of iterations of the EM step is a function of the number of iterations of the structure search step performed thus far, while the number of iterations of the structure search is a fixed number.

The foregoing examples use discrete variables in the Bayesian network where all of the conditional probabilities in the Bayesian network are represented as full tables. It is to be understood and appreciated that decision graphs could be employed instead of the tables in accordance with an aspect of the present invention.

Implementations of Mixtures of Bayesian Networks

Figure 8:
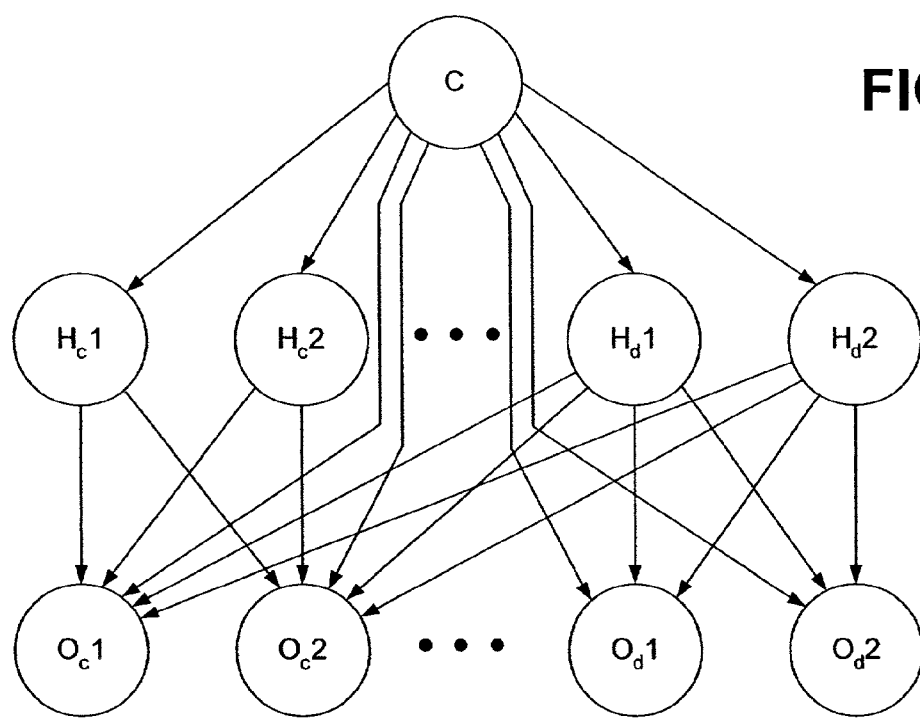
FIG. 8 depicts an initial Bayesian network in accordance with an aspect of the present invention.

FIG. 8 illustrates an example of a Bayesian network consisting of the class variable C connected to every other variable, the continuous hidden variables $H_c$ connected to all continuous observed variables, the discrete hidden variables $H_d$ connected to all observed variables, the continuous observed variables $O_c$ and the discrete observed variables $O_d$.

In accordance with an aspect of the present invention, the model depicted in FIG. 8 represents a mixture of individual Bayesian networks, each individual network corresponding to the hypothesis that the class variable C is in a particular one of its states (e.g., C=$c_i$). Each individual network in the mixture is therefore referred to as a hypothesis-specific Bayesian network (HSBN). The corresponding mixture of Bayesian networks (MBNs) consisting of plural HSBNs is illustrated in FIG. 9.

Figure 9:
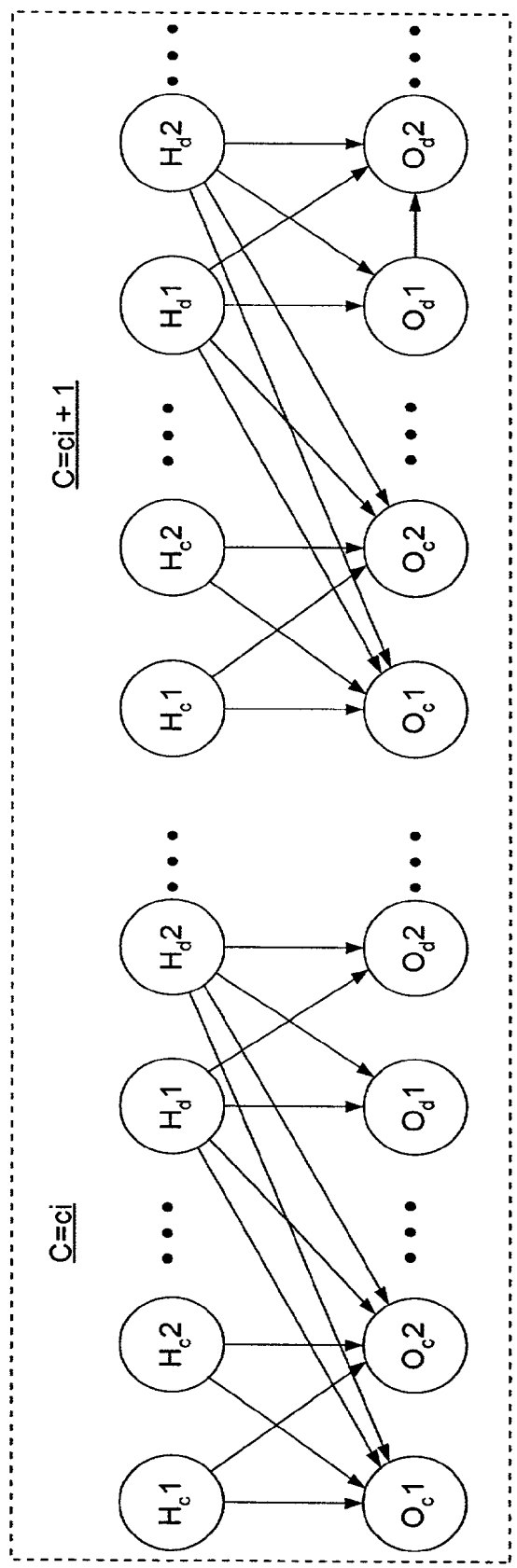
FIG. 9 depicts a mixture of hypothesis specific networks corresponding to the network of FIG. 8.

As indicated in the drawing of FIG. 9, one HSBN corresponds to the hypothesis that C=$c_i$ while another HSBN corresponds to the hypothesis that C=$c_{i+1}$, and so forth. In each HSBN of FIG. 9, the class variable C is not included because its state is hypothetically known for each HSBN, and is therefore not a variable. The other variables of the network of FIG. 9, namely the hidden variables H and the observed variables O, are included in each HSBN of FIG. 8. However, after the individual HSBN structures and parameters have been learned, different HSBNs will tend to have different structures, as indicated in FIG. 9.

Figure 10:
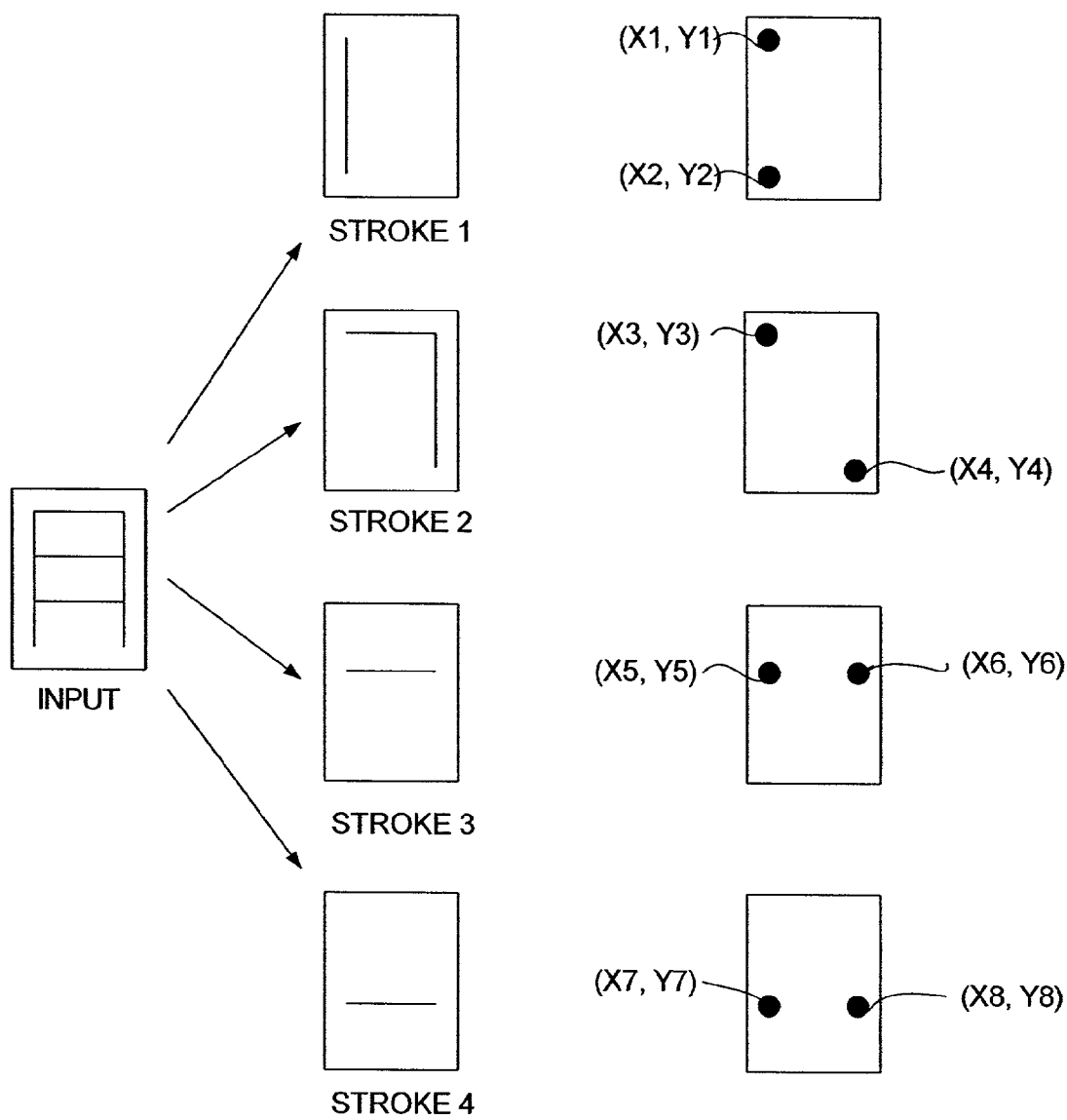
FIG. 10 are an example of an input character and examples of possible features derived from the character in accordance with an aspect of the present invention.

FIG. 10 illustrates an example of a fictitious character 吕, which consists of four strokes, as shown. Prior to generating a MBN for the character, each stroke is converted into a set of features or visual observation elements. In the example of FIG. 10, the features correspond to the beginning and end positions of each stroke, indicated as relative coordinates (X1, Y1) . . . (X8, Y8). Thus, in this example, the character 吕 is converted into eight ($X_i$, $Y_j$) pairs, with each coordinate corresponding to a feature. It is to be understood and appreciated that the stroke position features are simply for purposes of ease of illustration and that other character features, such as parts of the character strokes located between the start-stop positions, curvature of character strokes, can be used in accordance with an aspect of the present invention. For example, the particular features used in modeling a given character generally will depend on the character being modeled.

Figure 11:
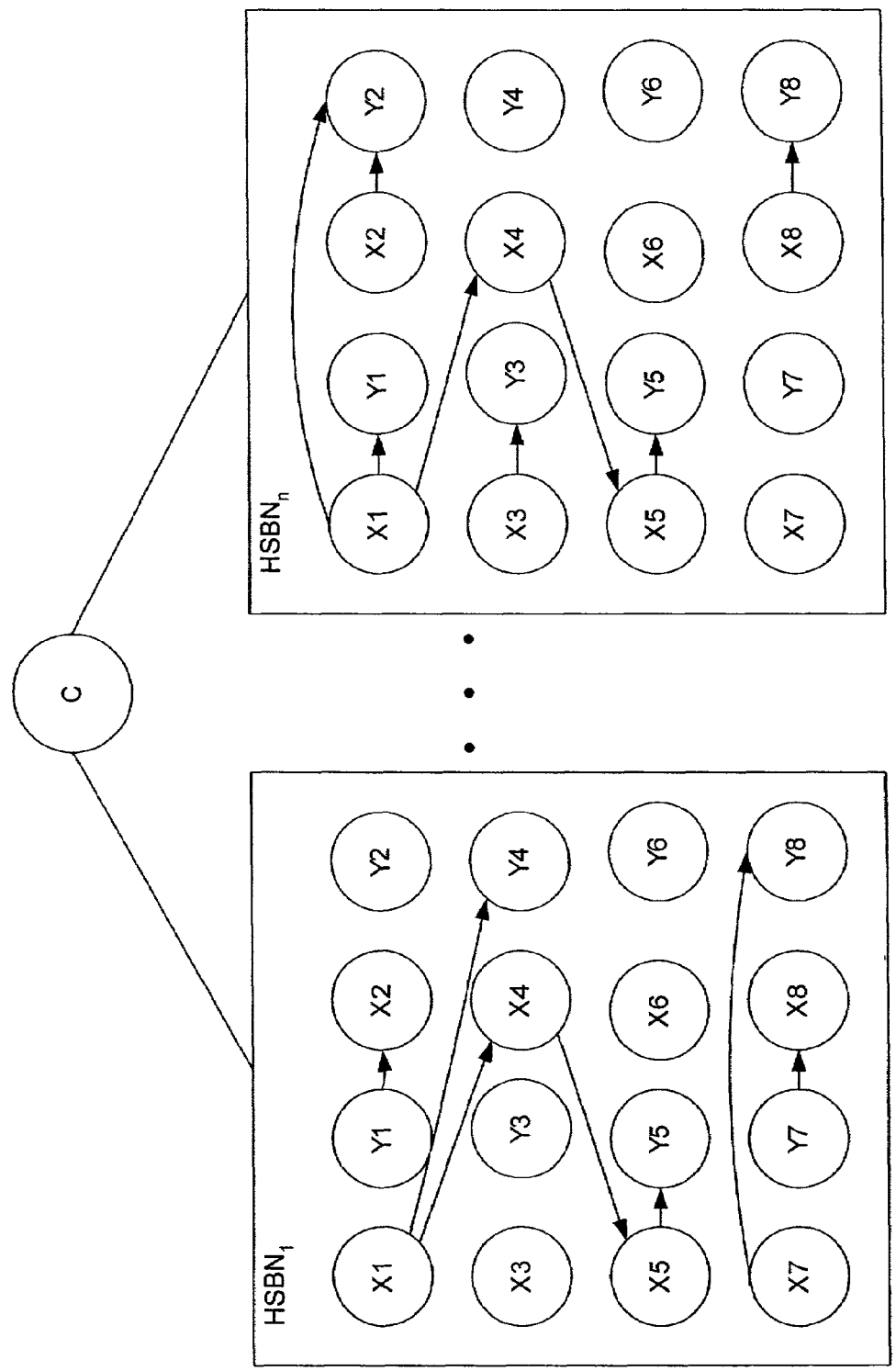
FIG. 11 is an example of a mixture of Bayesian networks (MBN) for scoring the character of FIG. 10 in accordance with an aspect of the present invention.

FIG. 11 depicts an example of a MBN that can be constructed for scoring the four-stroke character 吕 shown in FIG. 10. The MBN includes a plurality of HSBNs, indicated as $HSBN_1$ to $HSBN_n$, where n is positive integer. Thus, the MBN of FIG. 11 has n possible values. Each HSBN models the probabilities of observing sets of visual observations corresponding to a handwritten character, as represented by the common external hidden variable C, is in a respective one of a plurality of its discrete states (e.g., a fixed predetermined number of states).

Each HSBN includes a plurality of nodes in which each respective node corresponds to a feature or visual observation element for one of the four strokes (e.g., X1 . . . Y8). Dependencies and interrelationships between nodes are represented by arcs interconnecting certain nodes, which defines the structure of each HSBN and, collectively, of the MBN. For example, in HSBN1, the arc between X1 and X4 represents the relationship between the start position of the first stroke to the end position of the second stroke. The other arcs can represent similar types of relationships.

One restriction on the dependencies between nodes in a given HSBN can be the character completion order. For example, each HSBN shown in FIG. 11 enforces the restriction that features in later strokes cannot connect back to features in an earlier stroke. As described below, this restriction facilitates character completion.

By way of illustration, the MBN has a score determined by the set of probability parameters at each node of each HSBN. That is, each node stores a set of probability parameters that define the distribution of probabilities across different states of the visual observation for a given character. If all cases of characters in the empirical data database are drawn from a multivariate normal distribution, the scoring takes advantage of the fact that a set of variables has a multivariate normal distribution if and only if each particular variable is an independent (univariate) normal distribution, when conditioned on the variables that precede the particular variable in some ordering (e.g., the restriction on completion order). The set of parameters at each node of each HSBN are functionally related to a normal distribution having a mean, a variance, and coefficients. Each of the coefficients, sometimes referred to as partial regression coefficients, indicates the strength of the connection between the mean of a first variable and the value of a second variable, as represented by the respective arcs. Thus, a coefficient for a given pair of variables is equal to zero if and only if there is no arc connecting nodes for the given pair of variables.

Figure 12:
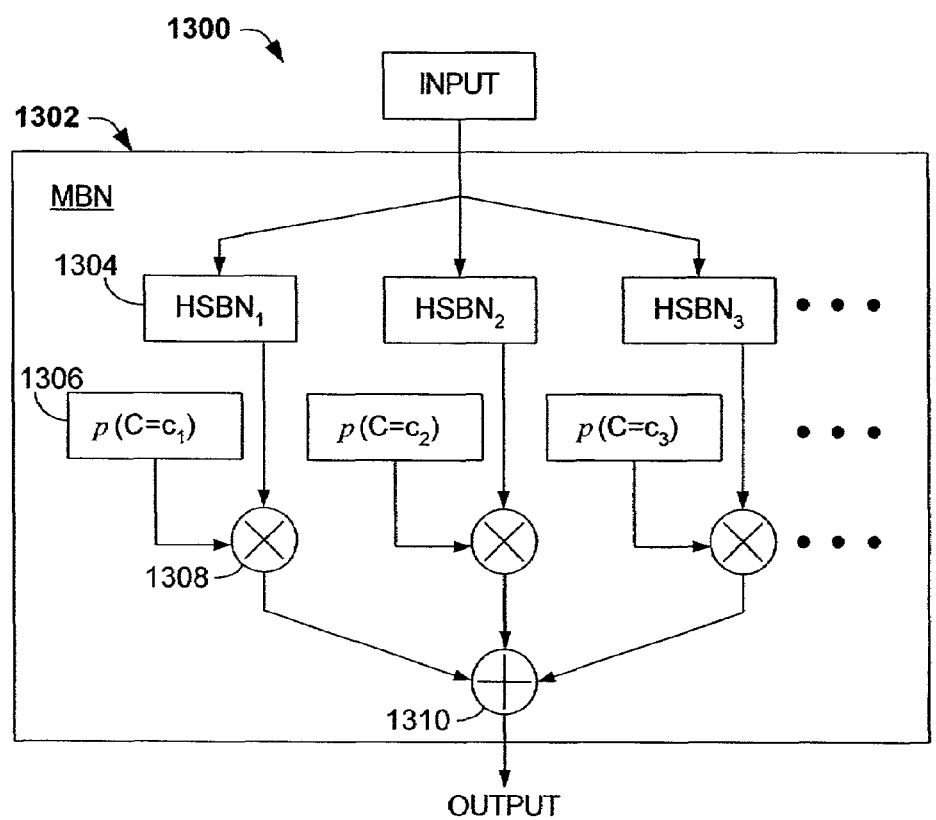
FIG. 12 illustrates an inferencing system including a mixture of Bayesian networks in accordance with one aspect of the invention.

FIG. 12 illustrates an example of an inferencing system 1300 that includes an MBN 1302 in accordance with an aspect of the present invention. The MBN includes a set of HSBNs 1304, such as represents character completion characteristics for the character defined by the MBN. Each HSBN 1304 is associated with a weight 1306 equal to the probability of the class variable C being in the corresponding state, such as according to the interrelationships between features in each HSBN. Multipliers 1308 combine the output of each HSBN 1304 with the corresponding weight 1306 and an adder 1310 computes the sum of the products. An input is applied to all the HSBNs 1304 simultaneously, resulting in a single inference output from the MBN 1302, which indicates the likelihood that the input character corresponds to the character for which the MBN was created.

Figure 13:
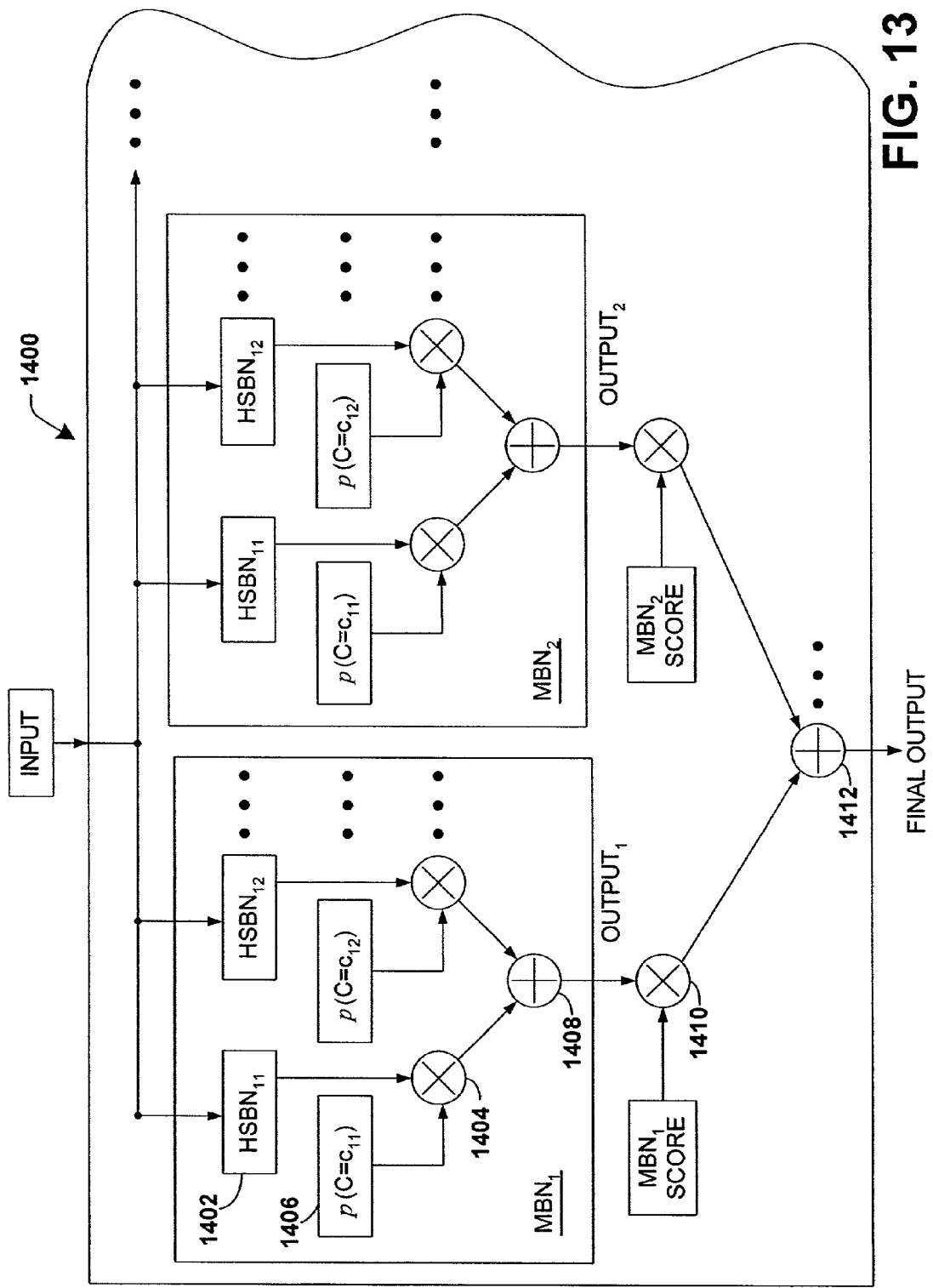
FIG. 13 illustrates an inferencing system including a collection of mixtures of Bayesian networks in accordance with another aspect of the invention.

FIG. 13 illustrates an example of an inferencing system 1400 that includes a collection of MBNs, indicated at $MBN_1$ to $MBN_n$. Each MBN can be of the type described in FIG. 12, namely, configured to model features and interrelationships for character strokes of a given character. Briefly stated, each MBN includes a plurality of HSBNs 1402 having a value indicative of the likelihood that a class value for a character is in a given state. A multiplier 1404 associates each HSBN with a weight 1406 indicative of the probability of the class variable C being in the corresponding state. The weighted HSBN values are summed by an adder 1408 to provide the MBN output.

The scores for each MBN have been previously computed, as described herein, at the time each respective MBN is generated before inferencing is performed. Each MBN output is weighted by the corresponding MBN score by a multiplier 1410, and an adder 1420 combines the weighted MBN outputs into a single output of the collection of MBNs.

Figure 14:
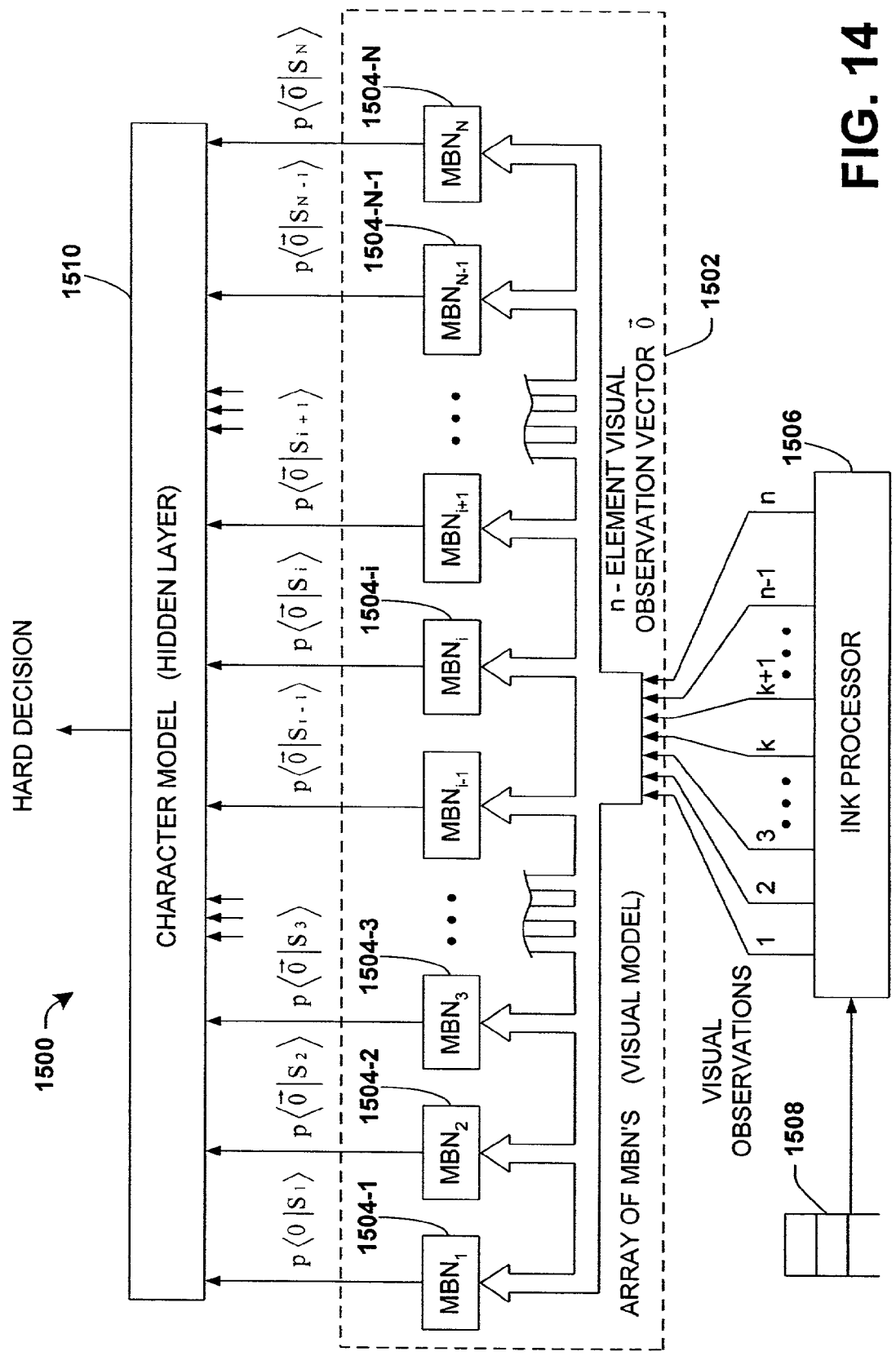
FIG. 14 is a schematic block diagram of a handwriting recognition system employing an array of mixtures of Bayesian networks (MBNs) of the invention.

FIG. 14 illustrates a particular example of a handwriting recognition system 1500 in accordance with an aspect of the present invention. The MBN handwriting recognition system 1500 employs an array of MBNs 1502 having N MBNs 1504-1 through 1504-N as the visual model, where N is the number of characters. In the example of FIG. 14, the MBN array 1502 has a large number (N) of MBNs 1504, each MBN 1504 corresponding to one k-stroke handwritten character, N being the number of all possible k-stroke characters and k being the number of strokes. A stroke is a continuous (e.g., curved or straight) line drawn by the user whose start-stop points typically correspond to pen-down and pen-up actions, respectively.

An ink processor 1506 processes incoming handwriting signals 1508 or "visual patterns ". It is to be appreciated that the incoming signals can be entered directly at the system or be received via a remote link (e.g., a network or communications link). The ink processor 1506 processes the incoming signal to produce vectors of start-stop points for each of the strokes corresponding to a k-stroke character. Alternative and/or additional visual patterns (e.g., features of each k-stroke character) can be constructed by the ink processor, such as, but not limited to, points between the start-stop positions, Chebyshev's coefficients and the like.

For the language of Japanese, as an example, handwriting recognition scientists have identified groups of stroke counts into which all characters may be divided. The number of characters in each k-stroke group ranges from approximately 200 to 3000 characters depending on the stroke count (k). The MBN array 1502 therefore outputs approximately 200–3000 such probabilities depending on the stroke count identified for the visual pattern, one for each character in the stroke count group. These probabilities of visual pattern given individual characters are combined with a (possibly uniform) prior probability over the characters, such as by a character model (or hidden layer) 1510 employing Bayes rule, to yield the probability of the characters given the visual pattern.

Figure 15:
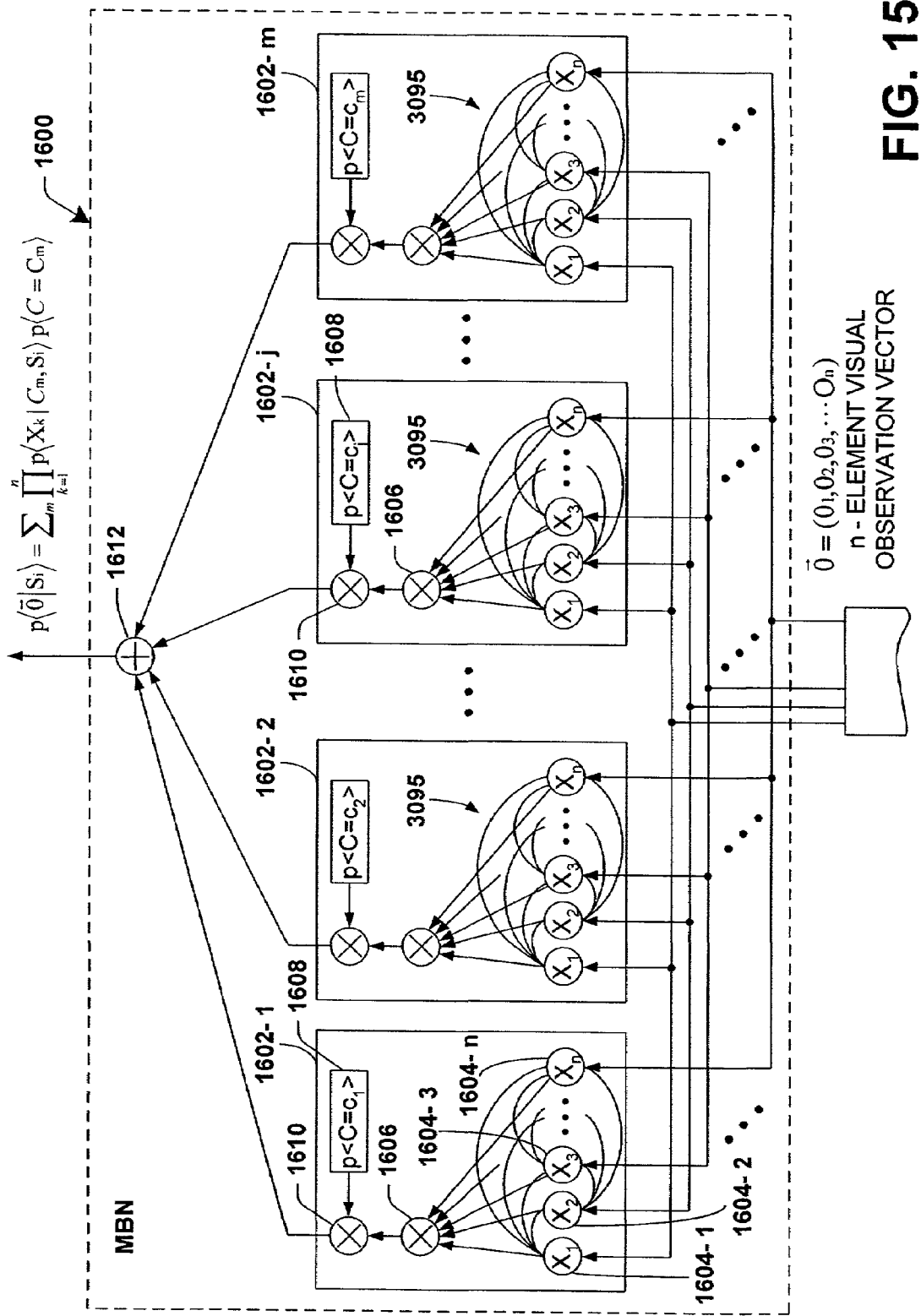
FIG. 15 is a schematic block diagram of a typical MBN in the handwriting recognition system of FIG. 14.

Initially, the MBNs 1504 in the array 1502 all can have the same structure. FIG. 15 illustrates an example of the structure of a typical MBN 1600. The MBN 1600 consists of m hypothesis-specific Bayesian networks (HSBNs) 1602-1 through 1602-m. As explained herein, each HSBN encodes probabilities of making observations given hidden variable states including a common discrete hidden variable C having m states not represented by any particular node in the network. Each HSBN corresponds to the hypothesis that C is in a particular one of its m states. Thus, the $j^{th}$ HSBN 1602-j corresponds to the hypothesis that C is in its $j^{th}$ state.

In accordance with one aspect of the present invention, the number m of components or HSBNs in each MBN is determined in accordance with techniques described above in this specification, and each MBN 1504 (FIG. 14) can have a different number m of HSBNs. Since each MBN models a particular character, m may be allowed to vary across characters. However, it may be possible for the skilled worker to construct a system in which m is fixed across characters.

In accordance with an aspect of the present invention, each HSBN can have a restricted form. This restricted from is related to the order in which the strokes of the character are written. For example, as mentioned above, each HSBN is not allowed to have any arcs from variables associated with the visual patterns for later stroke to variables associated with the visual pattern for an earlier stroke.

A system for character completion uses a set of MBN arrays. A character completion system identifies characters with the same or more strokes than the user has written. For instance, if a user inputs two strokes of a character, this character completion system obtains probabilities for characters with two strokes, three strokes, etc. . . . and provides the user with a list of characters that have the highest probabilities. The procedure for computing the probabilities for a user's strokes can be identical to the procedure described above when using an MBN array for characters with the same number of strokes. Those skilled in the art will appreciate that when using an MBN array for characters with more strokes than the user has written, one needs to use probabilistic inference to compute these probabilities.

Referring back to FIG. 15, each HSBN 1602 consists of a single layer of n nodes 1604-1 through 1604-n. The input to each node is a respective one of the n visual observations of the n-element (e.g., 4*k-element for start-stop) visual observation vector supplied by the processor 1506 (FIG. 14) for the current unknown character. Each node 1604 stores a set of probability parameters defining the distribution of probabilities across different states of the n-element visual observation vector of the $i^{th}$ character having been drawn. The probability parameters can be initialized to some uniform set and then improved during an iterative training process, as described herein. The outputs of the nodes 1604 of the $j^{th}$ HSBN 1602-j are multiplied together by a multiplier 1606. A memory 1608 stores the probability that the hidden "class" variable C is in its $j^{th}$ state (e.g., $p(C=c_j)$). This probability is the score of the goodness of the $j^{th}$ HSBN 1602-j at predicting training data, and is computed by using the MBN to perform inferencing in accordance with well-known Bayesian computational techniques. (Such a computation is discussed above in this specification.)

A multiplier 1610 multiplies the product or output of the multiplier 1606 by the contents of the memory 1608 (e.g., by $p(C=c_j)$) to produce the output of the $j^{th}$ HSBN 1602-j. An adder 1612 accumulates all of the HSBN outputs to produce the output of the MBN 1600, which is the probability of having observed the current 4*k-element visual observation vector assuming the $i^{th}$ character was drawn.

Referring between FIGS. 14 and 15, the number of HSBNs 1602 in each MBN 1504 can be determined as a function of the number of training examples for that character (e.g., m=2 for 1 to 300 training examples, m=3 for 301 to 1000 training examples, m=4 for 1001 to 3000 training examples, m=5 for 3001 to 5000 training examples, and for more than 5000 training examples m equals this number divided by 1000 with a maximum of e.g. m=10). Hence, the number of states for the hidden class variable C is in this case determined by the number of training examples. The hidden class variable C accounts for other variables not included in the model, such as, for example, different handwriting styles among different clusters of users.

While the example of FIG. 14 is disclosed as processing 4*k visual observations (n=4*k), encoding the probabilities of, for example, approximately 200–3000 k-stroke characters, and assuming that the number of states (m) for the hidden class variable C is a function of the number of training examples, other implementations of a handwriting recognition system in accordance with the present invention may employ different values of n and m. In accordance with another aspect of the present invention, the number of states, m, can be determined using a procedure described in U.S. application Ser. No. 09/220,198, U.S. Pat. No. 6,529,891 which is entitled AUTOMATIC DETERMINATION OF THE NUMBER OF CLASSES BY MIXTURES OF BAYESIAN NETWORKS. This approach also permits different characters in the model to be described by different MBNs with different numbers of HSBNs. In an alternative approach there is a predetermined fixed number of HSBNs 1602 in each MBN 1504 (e.g., m=5) so that the hidden class variable C has 5 states. Furthermore, while start-stop points are the parts of handwriting inferred in the system of FIG. 14, additional or alternative visual parts of handwritten characters could be selected by the skilled worker as the parts of handwriting to be inferred by the system.

As indicated in FIGS. 14 and 15, there are dependencies among the different nodes 1604 within each HSBN 1602. These dependencies are encoded in the probabilities stored in each node and are indicated by arcs connected between the various nodes 1604 within the HSBN 1602. The construction of each HSBN 1602 and, in particular, the search for optimum changes in the probability parameters stored within each node as well as the search for optimum changes in the arcs or structure are described below with reference to FIGS. 17 and 19–22.

Figure 16:
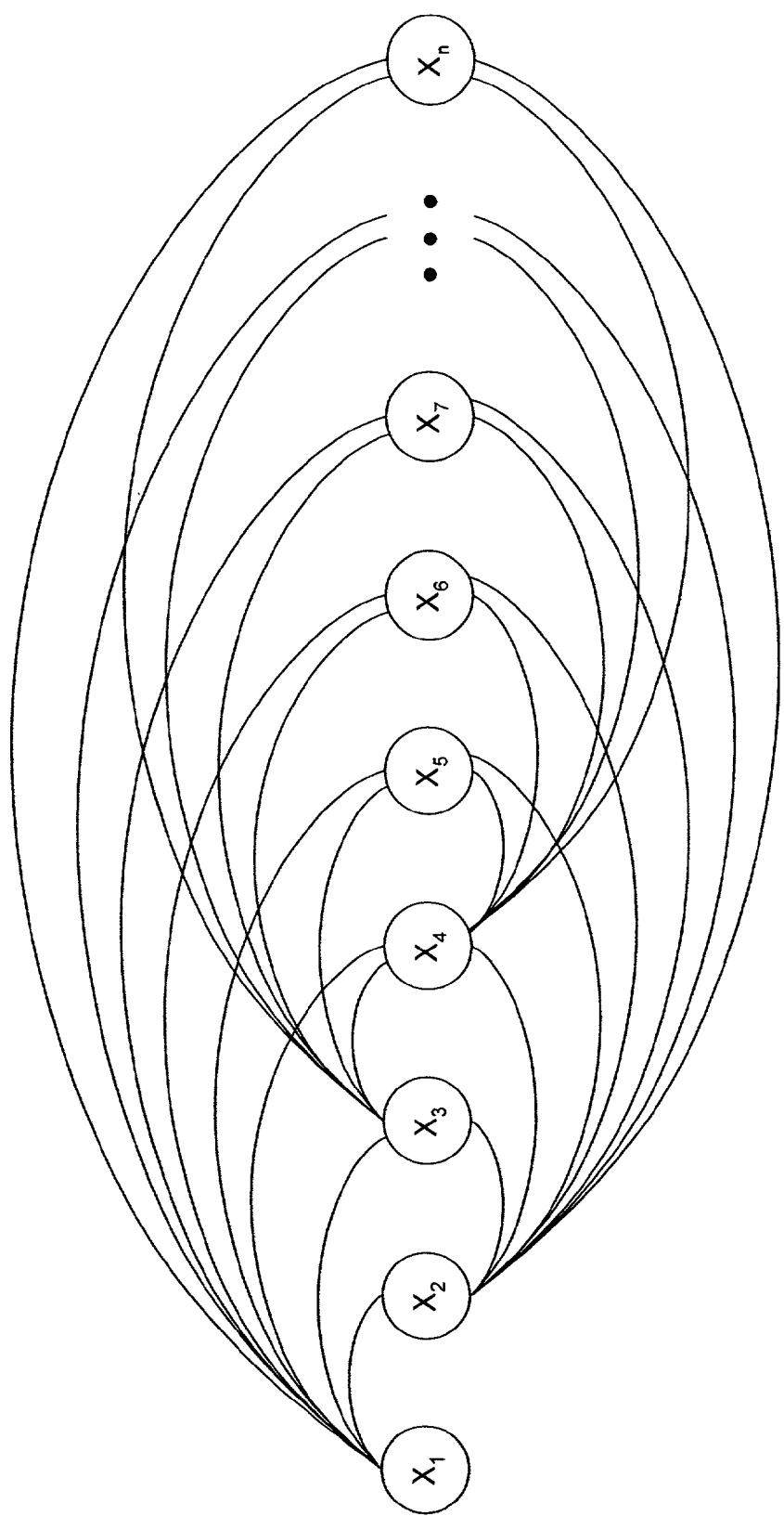
FIG. 16 is a schematic block diagram of a typical hypothesis-specific Bayesian network HSBN in the typical MBN of FIG. 15, illustrating the possible dependencies among the nodes in each HSBN.

FIG. 16 illustrates an example of all possible arcs in typical HSBN having nodes $X_1$–$X_n$. In the learning process, each HSBN may be initialized with all possible arcs being present, as illustrated in FIG. 16. Then, with successive iterations of the training process (e.g., according to that shown and described with respect to FIG. 19, 20, 21, or 22) some of the arcs may disappear or reappear as the probability parameters stored in the nodes are modified and performance scores improve. As the training process proceeds, the different HSBNs may evolve to have different structures that define probability parameters that a given class variable corresponding to a character is in a particular state.

Figure 17:
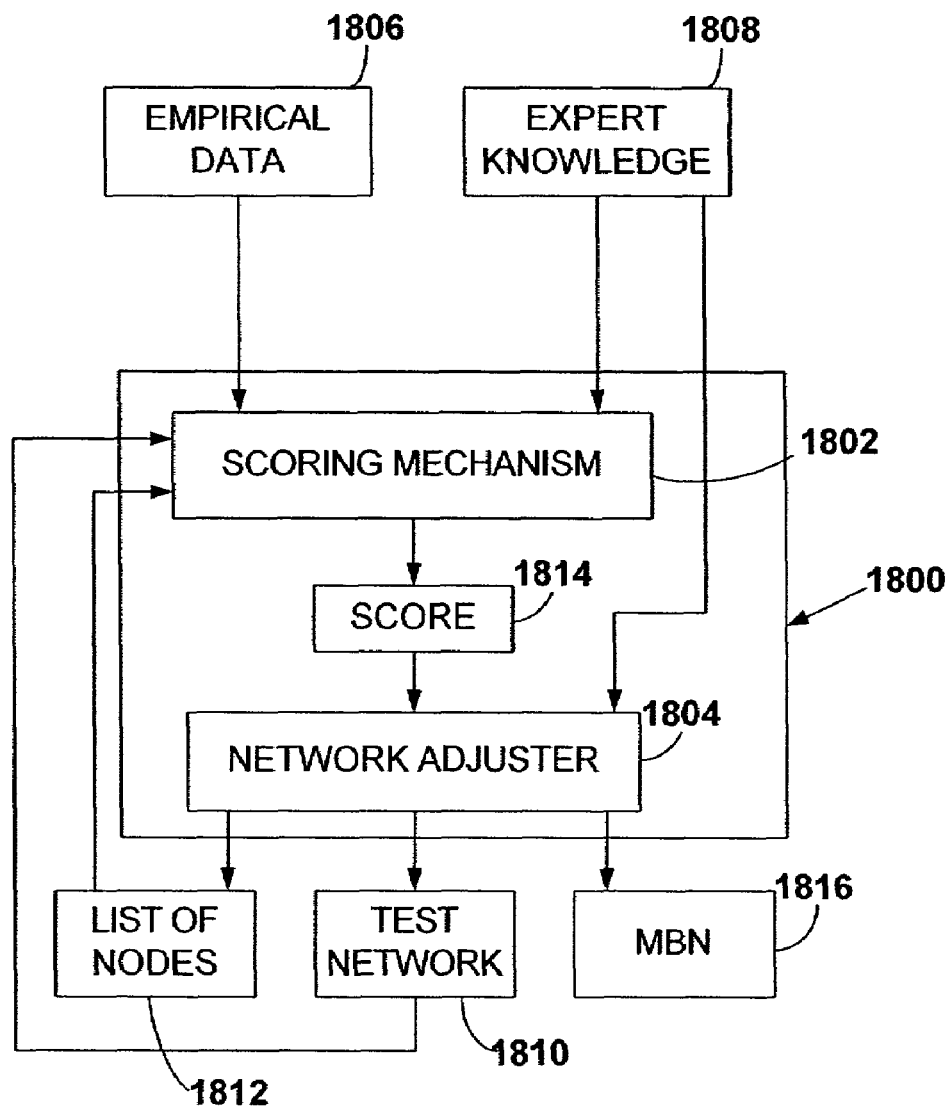
FIG. 17 depicts a more detailed diagram of the MBN generator of FIG. 4.

A Structure Search:

Searching for Optimum Structure and Scoring the Hypothesis-Specific Network Structure FIG. 17 depicts an example of an MBN generator 1800 in accordance with an aspect of the present invention. The MBN generator 1800 includes a scoring mechanism 1802 and a network adjuster 1804. The scoring mechanism 1802 receives expert knowledge 1806, empirical data 1808, a test network 1810 and a list of nodes 1812 as input. The expert knowledge 1808 and empirical data 1806, for example, correspond to a sample of handwritten characters and associated rules for different characters, which can be derived using conventional techniques.

After receiving the information, the scoring mechanism 1802 generates a score 1814 that ranks the nodes of test network 1810 as indicated by the list of nodes 1812 for goodness. Thus, the score 1814 contains a subscore for each node scored. Each subscore indicates how well the portion of the test network involving the node corresponding to the subscore and the parents of the node is at rendering inferences for a given character based on the empirical data 1806 and the expert knowledge 1808. The test network 1810 received as input to the scoring mechanism 1802 is either the prior network or a test network generated by the network adjuster 1804, depending on the circumstances.

For example, the scoring mechanism 1802 uses the initial network as the test network for the first invocation of the scoring mechanism. After the first invocation of the scoring mechanism 1802, the test network received by the scoring mechanism 1802 is the test network 1810 generated by the network adjuster 1804. In accordance with a particular aspect of the present invention, a Bayesian network (e.g., the initial network or the test network 1810) is stored in memory as a tree data structure (e.g., a decision graph) where each node in the tree data structure corresponds to a node in the Bayesian network. The arcs of the Bayesian network are implemented as pointers from one node in the tree data structure to another node, which can be implemented according to a stroke completion restriction. In addition, the probabilities for each node in the Bayesian network are stored in the corresponding node in the tree data structure.

The network adjuster 1804 receives as input the score 1814 and the initial network and generates a new test network 1810 in response thereto, which is then passed back to the scoring mechanism 1802 with a list of nodes 1810 that need to be rescored. After iterating many times between the scoring mechanism 1802 and the network adjuster 1804, the network adjuster eventually generates an improved MBN 1816 (hereinafter referred to as a Bayesian network). The network adjuster 1804 generates the improved Bayesian network 1816 when the scores 1814 generated do not improve. That is, the network adjuster 1804 retains the test network 1810 that the network adjuster last generated, modifies the test network based on the score 1814, and if the network adjuster cannot generate a test network with a better score than the retained test network, the network adjuster generates the retained test network as the improved Bayesian network 1816.

Although the above example has been described as iterating many times between the scoring mechanism 1802 and the network adjuster 1804, one skilled in the art will appreciate that a small number of fixed iterations (e.g., a single iteration) can be performed in accordance with an aspect of the present invention. In addition, it is to be appreciated that the initial network used by the scoring mechanism 1802 of the exemplary embodiment can consist of all discrete variables, all continuous variables, or a combination of discrete and continuous variables.

Figure 18:
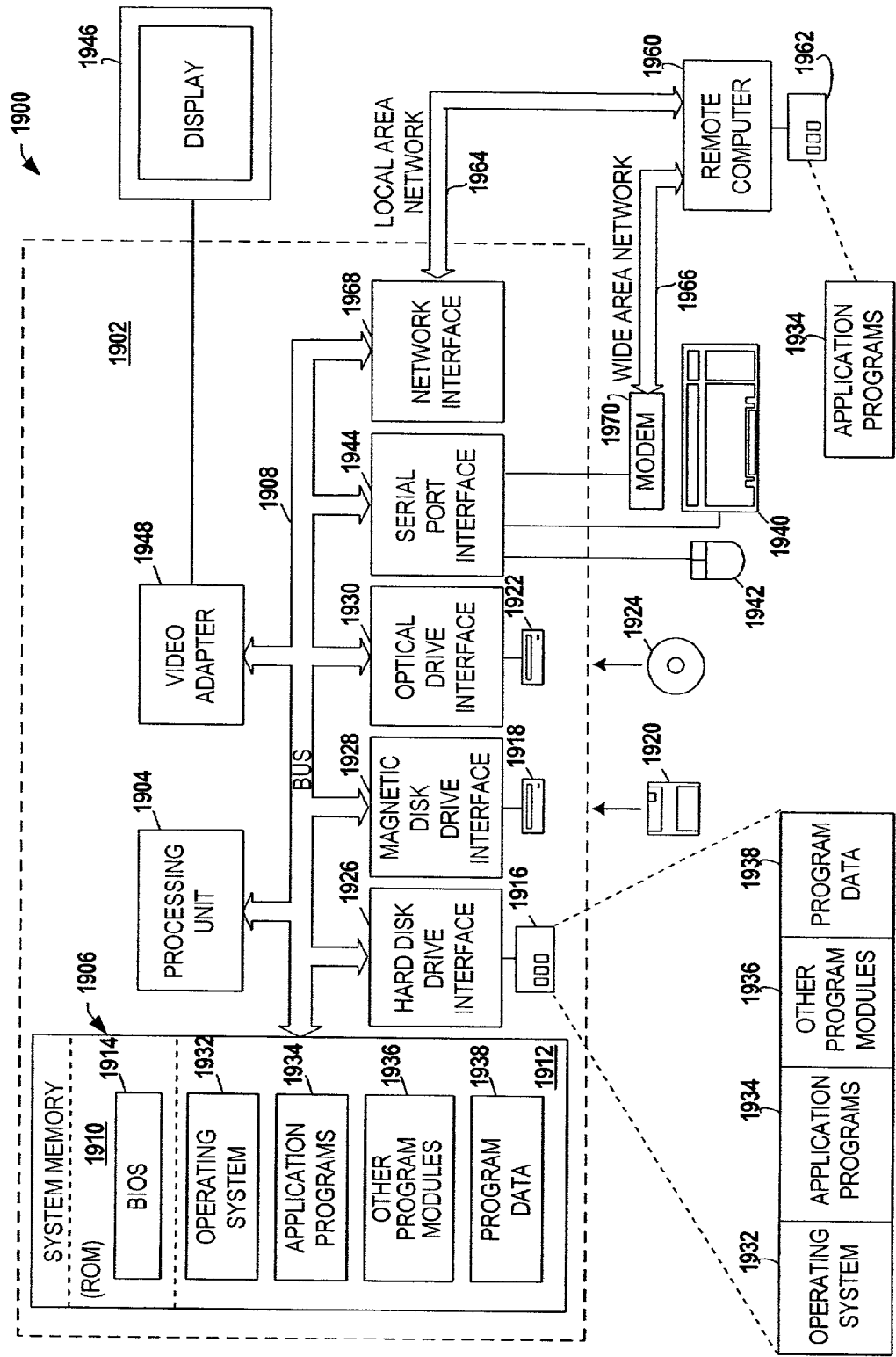
FIG. 18 depicts a computer system suitable for practicing an exemplary embodiment of the present invention.

In order to provide additional context for various aspects of the present invention, FIG. 18 and the following discussion are intended to provide a brief, general description of one possible suitable environment 1900 in which the various aspects of the present invention may be implemented. It is to be appreciated that the computing environment 1900 is but one possible computing environment and is not intended to limit the environments with which the present invention can be employed. Those skilled in the art will appreciate that the inventive methods may be practiced with other system configurations, including single-processor or multiprocessor computer systems, minicomputers, mainframe computers, as well as personal computers, hand-held computing devices, microprocessor-based or programmable consumer electronics, video game consoles, and other programmable equipment in which it may be desirable to generate or utilize a model for handwriting character recognition in accordance with an aspect of the present invention.

The illustrated aspects of the invention may also be practiced in distributed computing environments where certain tasks (e.g., processing input characters or generating models) are performed by remote processing devices that are linked through a communications network. In a distributed computing environment, program modules for carrying one or more aspects of the present invention can be located in local and/or remote memory storage devices.

While various aspects of the present invention have been described above in the general context of computer-executable instructions that may run on one or more computers or other microprocessor-based equipment, it is to be recognized that the invention also may be implemented in combination with other program modules and/or as a combination of hardware and software. Generally, program modules include routines, programs, components, data structures, etc. that perform particular tasks or implement particular abstract data types.

FIG. 18 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 18, the exemplary environment 1900 for implementing various aspects of the invention includes a computer 1902, including a processing unit 1904, a system memory 1906, and a system bus 1908 that couples various system components including the system memory to the processing unit 1904. The processing unit 1904 may be any of various commercially available processors. Dual microprocessors and other multi-processor architectures also can be used as the processing unit 1904.

The system bus 1908 may be any of several types of bus structure including a memory bus or memory controller, a peripheral bus, and a local bus using any of a variety of commercially available bus architectures. The system memory 1906 includes read only memory (ROM) 1910 and random access memory (RAM) 1912. A basic input/output system (BIOS) 1914, containing the basic routines that help to transfer information between elements within the computer 1902, such as during start-up, is stored in ROM 1912. For example, program modules for implementing training or inferencing aspects can be stored in the RAM 1912.

The computer 1902 may further include a hard disk drive 1916, a magnetic disk drive 1918, e.g., to read from or write to a removable disk 1920, and an optical disk drive 1922, e.g., for reading and/or writing data relative to 1924 optical media. The hard disk drive 1916, magnetic disk drive 1918, and optical disk drive 1922 are connected to the system bus 1908 by a hard disk drive interface 1926, a magnetic disk drive interface 1928, and an optical drive interface 1930, respectively. The respective computer readable media 1916, 1920, 1924 further can store empirical data and/or expert data as well as program instructions for carrying out aspects of the present invention.

It is to be appreciated that the computer (or other device) 1902 includes computer readable media that may comprise any type of computer storage media and communication media. Computer storage media may include volatile and nonvolatile, removable and non-removable media implemented in any method or technology for storage of information such as computer readable instructions, data structures, program modules, or other data. Computer storage media may include RAM, ROM, EEPROM, flash memory or other memory technology, CD-ROM, digital versatile disks (DVD), or other magnetic storage devices, or any other medium which can be used to store the desired information and which can be accessed by the computer 1902. Communication media typically embodies computer readable instructions, data structures, program modules or other data in a modulated data signal such as a carrier wave or other transport mechanism and includes any information delivery media. A modulated data signal includes a signal that has one or more of its characteristics set or changed in such a manner as to encode information provided in the signal. By way of example, communication media may include wired media such as a wired network or direct-wired connection, and wireless media such as acoustic, RF, optical and other wireless media. Combinations of any of the above should also be included within the scope of computer readable media.

A number of program modules may be stored in the drives and RAM 1912, including an operating system 1932, one or more application programs 1934, other program modules 1936, and program non-interrupt data 1938. The operating system 1932 in the illustrated computer can be any of a number of commercially available or proprietary operating systems. The application programs thus can include executable instructions: for generating MBNs, including training thereof, for performing inferencing and recognizing handwritten characters from MBNs; and for performing other aspects in accordance with an aspect of the present invention.

A user may enter commands and information into the computer 1902 through a keyboard 1940 and a pointing device, such as a mouse 1942. Other input devices (not shown) may include a microphone, an IR remote control, a joystick, a game pad, a satellite dish, a scanner, or the like. These and other input devices are often connected to the processing unit 1904 through a serial port interface 1944 that is coupled to the system bus 1908, but may be connected by other interfaces, such as a parallel port, a game port, a Universal Serial Bus ("USB"), an IR interface, etc. A display device (e.g., CRT, LCD and the like) 1946 is also connected to the system bus 1908 via an interface 1948, such as a video adapter. In addition to the display 1946, the computer 1902 also can include other peripheral output devices (not shown), such as speakers, printers etc. It is to be appreciated that the display (e.g., a touch screen) can be used to enter handwritten characters into the system.

The computer 1902 may operate in a networked environment using logical connections to one or more remote computers, such as a remote computer(s) 1960. The remote computer(s) 460 may be a workstation, a server computer, a router, a personal computer, a microprocessor based entertainment appliance, a peer device, or other common network node. The remote computer may include many or all of the elements described relative to the computer 1902, although, for purposes of brevity, only a memory 1962 is illustrated. The logical connections depicted include a local area network (LAN) 1964 and a wide area network (WAN) 1966, such as the Internet. Such networking environments are commonplace in offices, enterprise-wide computer networks, intranets, and the Internet.

When used in a LAN networking environment, the computer 1902 is connected to the local network 1964 through a network interface or adapter 1968. When used in a WAN networking environment, the computer 1902 typically includes a modem 1970, or is connected to a communications server on the LAN, or has other means for establishing communications over the WAN 1966. The modem 1970, which may be internal or external relative to the computer 1902, is connected to the system bus 1908 via the serial port interface 1944. In a networked environment, program modules 1936, application programs, or portions thereof, may be stored in the remote memory storage device 1962. Similarly, when the computer 1902 stores target data, such data may be stored in memory 1926, 1928, 1930 of the computer or remote memory 1962. It will be appreciated that the network connections shown are exemplary and other means of establishing a communications link between the computers can be used. Thus, visual data for handwritten characters can be provided via either network 1964 and/or 1966 or other types of communications links.

In view of the exemplary systems shown and described above, methodologies, which may be implemented in accordance with the present invention, will be better appreciated with reference to the flow charts of FIGS. 19–27B. While, for purposes of simplicity of explanation, the methodologies are shown and described as implementing serially, it is to be understood and appreciated that the present invention is not limited by the illustrated order, as some features can, in accordance with the present invention, occur in different orders and/or concurrently with other features shown and described herein. Moreover, not all illustrated aspects may be required to implement a methodology in accordance with the present invention. In addition, the methodologies of FIGS. 19–27B can be described in the general context of computer-executable instructions, such as program modules, executed by one or more computers or other devices. Also, the functionality of the program modules can be combined or distributed as desired in various embodiments.

Figure 19:
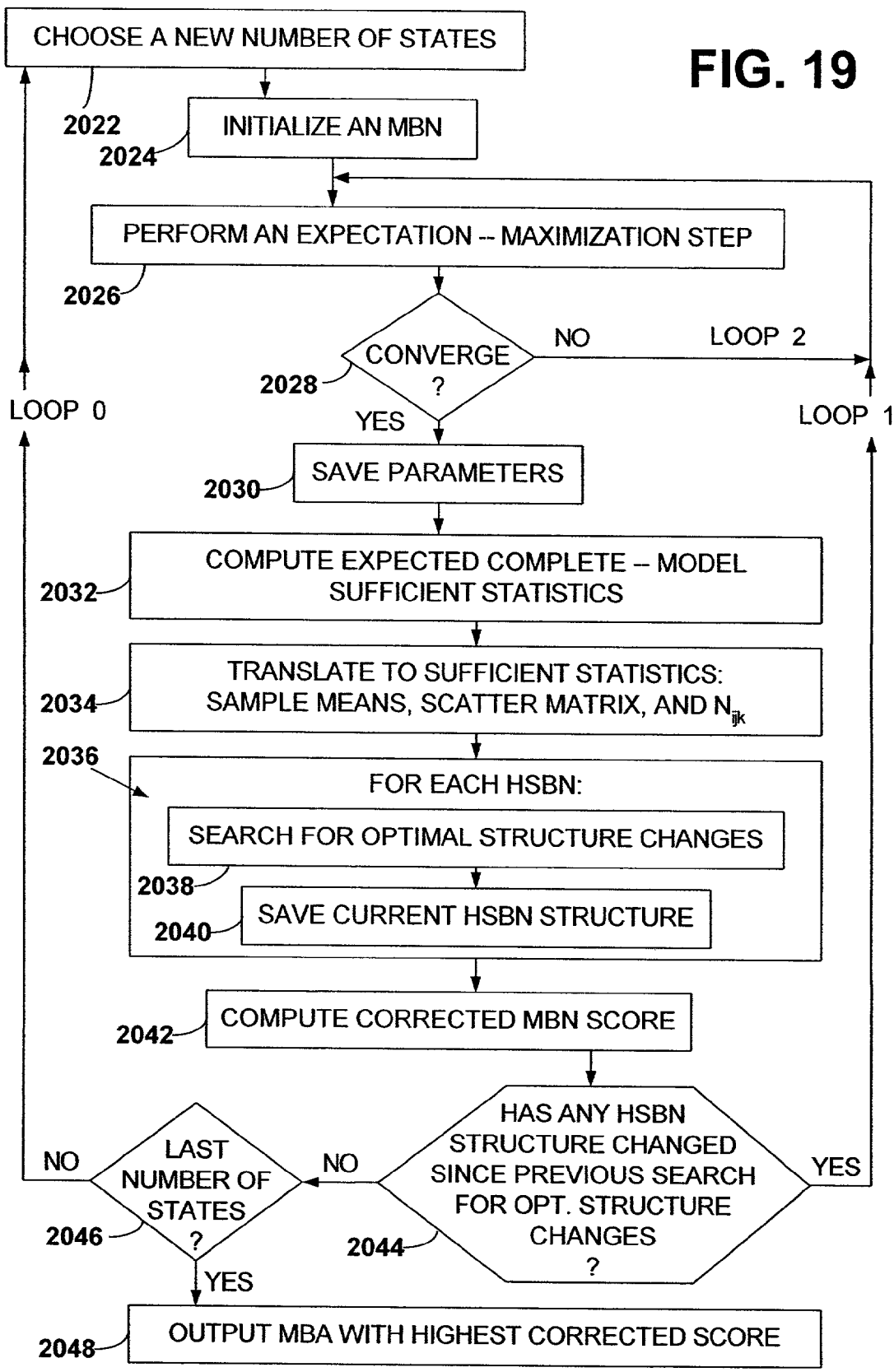
FIG. 19 illustrates a method of generating mixtures of Bayesian networks in accordance with a first aspect of the present invention.

FIG. 19 illustrates an example of a process for generating mixtures of Bayesian networks (MBNs) in accordance with an aspect of the present invention. The process begins at 2022 by choosing the number of states of the external class variable C and of each discrete hidden variables $H_d$. The number of states of C determines the number of HSBNs in the MBN to be generated. When this step is initially performed, the number of states of C and the number of states of each discrete hidden variable H can be set to their smallest values. For example, if the possible number of states of C lies in a range of 5 and 10, the number of states of $H_{d1}$ lies in a range of 3 and 6 and the number of states of $H_{d2}$ lies in a range of 11 and 14, then the lowest number in each range is chosen initially. In subsequent repetitions of this step by an outer loop (which will be discussed below), all combinations of the numbers of states are eventually chosen.

Next, at 2024, an MBN is initialized. This can be implemented by forming an MBN consisting of identical HSBNs with an arc from each hidden variable to each observed variable, with the proviso that continuous hidden are connected only to continuous observed variables, such as shown in FIGS. 8 and 9. Also, in conjunction with 2024, the HSBN parameters are initialized using, for example, the marginal+noise method. An expectation-maximization step is then performed at 2026 on all HSBNs in the MBN. The expectation-maximization step is described in Dempster et al, "Maximum Likelihood From Incomplete Data Via the EM Algorithm", *Journal of the Royal Statistical Society* B, Volume 39 (1977). The E-M step produces a more optimal version of the parameters of the individual HSBNs.

At 2028, a test for convergence is performed. If the expectation-maximization step has not converged (e.g., a negative determination at 2028), then the process loops back to 2026 the expectation-maximization step of 2026 in an inner loop (loop 2 of FIG. 19). Otherwise, if there is convergence at 2028, the process proceeds to 2030 in which the network parameters are saved.

At 2032, the expected complete-model sufficient statistics (ECMSS) are then computed. The computation of each of the probabilities p($\Delta$) in T($x_{case}$) can be performed by conventional inference techniques using the current version of the MBN. An example of how inferencing can be performed with an MBN is described herein with reference to FIG. 12. The computation of T($x_{case}$) has been described above. Next, at 2034, the ECMSS are then translated (e.g., using conventional techniques) into expected sufficient statistics $N_{ijk}$, sample means, scatter matrix, and sample size for each HSBN, all of which are further described below in this specification with reference to a structure search process.

At 2036, an optimum structure is found for each HSBN by treating the expected sufficient statistics as sufficient statistics for complete data. The methodology performed at 2036 includes searching for the optimum structure of the HSBN (2038) and saving the optimum structure HSBN (2040). An example of a search that can be performed at 2038 is described herein. The search employs the expected sufficient statistics, sample means, scatter matrix and sample size computed from the ECMSS at 2034. The search is based upon scoring each candidate structure of the HSBN, the score being the marginal likelihood of the expected complete data D given the candidate network structure s, namely p(D|s). With each selection of optimal structures for the HSBNs of the MBNs, an overall MBN score can be computed at 2042, as follows:

$$\text{score}(s) = p(s)p(D_c|s)\frac{p(D|\bar{\theta}, s)}{p(D_c|\bar{\theta}, s)} \qquad (1)$$

where $\bar{\theta}$ denotes the MAP parameters given D, $D_c$ is a complete data set whose sufficient statistics are equal to the expected complete-model sufficient statistics, and p(s) is the prior probability of MBN structure s (prior on structure).

The prior on structure p(s) is given by:

$$p(s) = p(|C|) \Pi_{B_s^e \in MBN} p(B_s^l || C|)$$

where |C| is the number of states of the hidden variable C. The exemplary embodiment uses the log of the score in order to reduce numerical instability:

$$\text{logscore}(s) = \log p(|C|) + \sum_{B_s^e \in MBN} \log p(B_s^l || C|) + \log p(D_c|s) + \log p(D|\bar{\theta}, s) - \log p(D_c|\bar{\theta}, s)$$

The MBN score is commonly referred to as the Cheeseman-Stutz score. (See P. Cheeseman and J. Stutz, "Bayesian Classification AutoClass: Theory and Results", *Advances in Knowledge Discovery and Data Mining*, AAAI Press [1995]).

Next, at 44, a test for convergence of the structure search of at 2038 is performed. The test for convergence in this embodiment can consist of inquiring whether any HSBN structure within the present MBN has changed since the performance of this convergence test or since the HSBNs were initialized. If there have been any structural changes, the structure search has not converged and the process returns to 2026 to perform another expectation-maximization step in loop 1 of FIG. 19. If the structure search has converged at 2044, such as by no structural changes since the previous iteration of loop 1, the process proceeds to 2046.

At 2046, a determination is made as to whether the various combinations of the number of states of the discrete class variable and discrete hidden variables have been exhausted. If the number of states has not been exhausted, the process loops back in an outer loop (loop 0 of FIG. 19) to 2022, in which the next combination of number of states is selected. Otherwise, if the number states has been exhausted, the process proceeds to 2048 in which the MBN having the highest score is selected and output for use in performing inferencing. Alternatively, or additionally, some or all of the MBNs are output as a collection of MBNs along with their respective MBN scores. In this alternative mode (described below herein), inferencing from a given input is performed by all of the MBNs in the collection in parallel, their outputs being weighted in accordance with their respective MBN scores, and the weighted sum of the MBN outputs being the output of the collection of MBNs.

Figure 20:
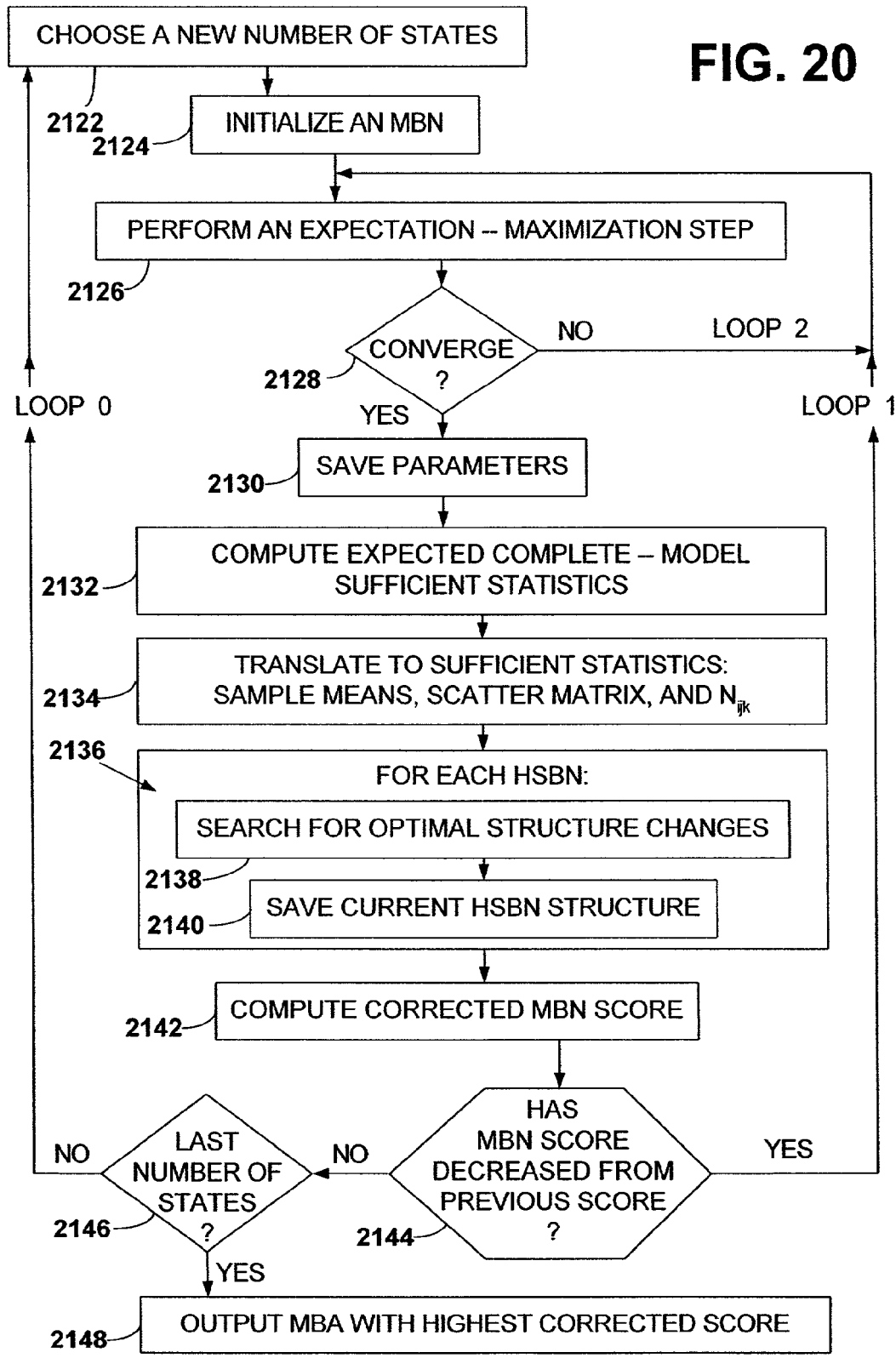
FIG. 20 illustrates a method of generating mixtures of Bayesian networks in accordance with a second aspect of the present invention.

FIG. 20 illustrates an alternative example of a process for generating an MBN in accordance with an aspect of the present invention. The process is similar to that described with respect to FIG. 19, with similar functionality identified by identical reference numbers increased by adding 100 to the reference numbers used in FIG. 19. The difference between the methodologies of FIGS. 19 and 20 is the test for convergence at 2144. In the example of FIG. 20, the test for convergence at includes determining whether the MBN score has decreased since the previous iteration of the middle loop. If the MBN score not increased, then loop 1 of FIG. 20 has converged and the process proceeds to 2146. Otherwise, if the score has increased, then loop 1 has not converged and the process returns to 2126 to perform an additional expectation-maximization step.

Figure 21:
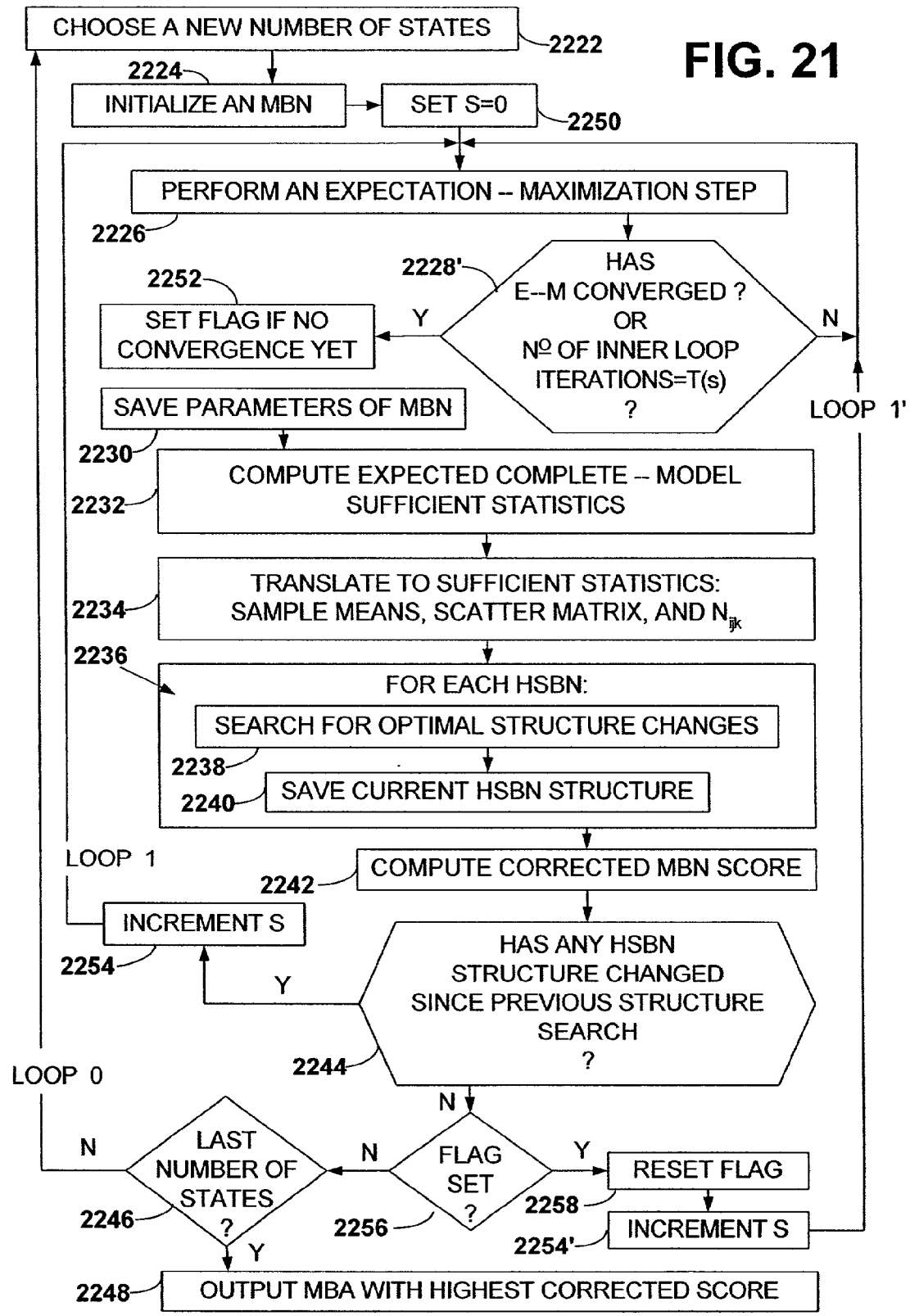
FIG. 21 illustrates a method of generating mixtures of Bayesian networks in accordance with a third aspect of the present invention.

FIG. 21 illustrates another variation of a process for generating an MBN in accordance with an aspect of the present invention. The process in FIG. 21 is similar to that described with respect to FIG. 19, with similar functionality identified by identical reference numbers increased by adding 200 to the reference numbers used in FIG. 19. In the example of FIG. 21, the number of iterations T of the inner loop (Loop 1) is a function T(S) of the number of iterations S of the outer loop (Loop 1').

The process begins at 2222 by choosing the number of states of the external class variable C and of each discrete hidden variables $H_d$. Next, at 2224 an MBN is initialized. Then, at 2250, the number of iterations of the outer loop, S, is initialized to zero. The expectation-maximization step is then performed at 2226 on all HSBNs in the MBN. At 2228', a determination is made as to whether the expectation-maximization process has converged, or, if not, whether loop 2 of FIG. 21 (the "inner loop") has iterated T(S) times. If neither condition is true, then the process loops back to 2226 in which an expectation-maximization step is performed in the inner loop. If at least one of the conditions of the determination at 2228' is true, a flag is set if the expectation-maximization process has not converged after T(S) iterations of the inner loop (2252). The network parameters are then saved (2230).

Next, at 2232, the expected complete model sufficient statistics (ECMSS) are then computed. At 2234, the ECMSS are then translated (e.g. using conventional techniques) into expected sufficient statistics $N_{ijk}$, sample means, scatter matrix and sample size, all of which are described below in this specification with reference to a structure search process. Next, at 2236, an optimum structure is found for each HSBN. The functionality associated with finding an optimum structure (2236) includes searching for the optimum structure of the HSBN 2238 and saving the optimum structure HSBN 2240. The search of block 2238 is described below in this specification, and employs the expected sufficient statistics, sample means, scatter matrix and sample size computed from the ECMSS at 2234. The search is based upon scoring each candidate structure of the HSBN, the score being the marginal likelihood of the expected complete data $D_c$ given the candidate network structure $B_s^e$, namely $P(D_c|B_s^e)$. With each selection of optimal structures for the HSBNs of the MBN, an overall MBN score is computed at 2242, such as previously described with reference to FIG. 19. This MBN score is the corrected version of the MBN score, such as in accordance with the Cheeseman-Stutz score (see P. Cheeseman and J. Stutz, "Bayesian Classification AutoClass: Theory and Results", *Advances in Knowledge Discovery and Data Mining*, AAAI Press [1995]).

Next, at 2244, a test for convergence of the structure search of step 2238 is performed. The test for convergence in this example includes inquiring whether any HSBN structure within the present MBN has changed since the performance of this convergence test. If there have been any structural changes, the structure search has not converged, in which case S is incremented at 2254 and the process loops back to the expectation-maximization step of block 2226 through loop 1 of FIG. 21. If, at 2244, there have been no structural changes since the previous iteration of loop 1 or 1', the structure search has converged and the process proceeds to 2256. At 2256, a determination is made as to whether the flag is set. If the flag is set, the flag is reset at 2258, S is incremented at 2254' and the process loops back to the expectation maximization step of block 2226 through loop 1' of FIG. 21. If, at 2256, the flag is not currently set, a determination is made at 2246 as to whether the various combinations of the number of states of the discrete class variable and discrete hidden variables has been exhausted. If the determination at 2246 is negative, the process loops back in an outer loop (Loop 0) to 2222, in which the next combination of number of states is selected. Otherwise, if the determination at 2246 is positive, the MBN having the highest score is selected and output at 2248 for use in performing inferencing.

Figure 22:
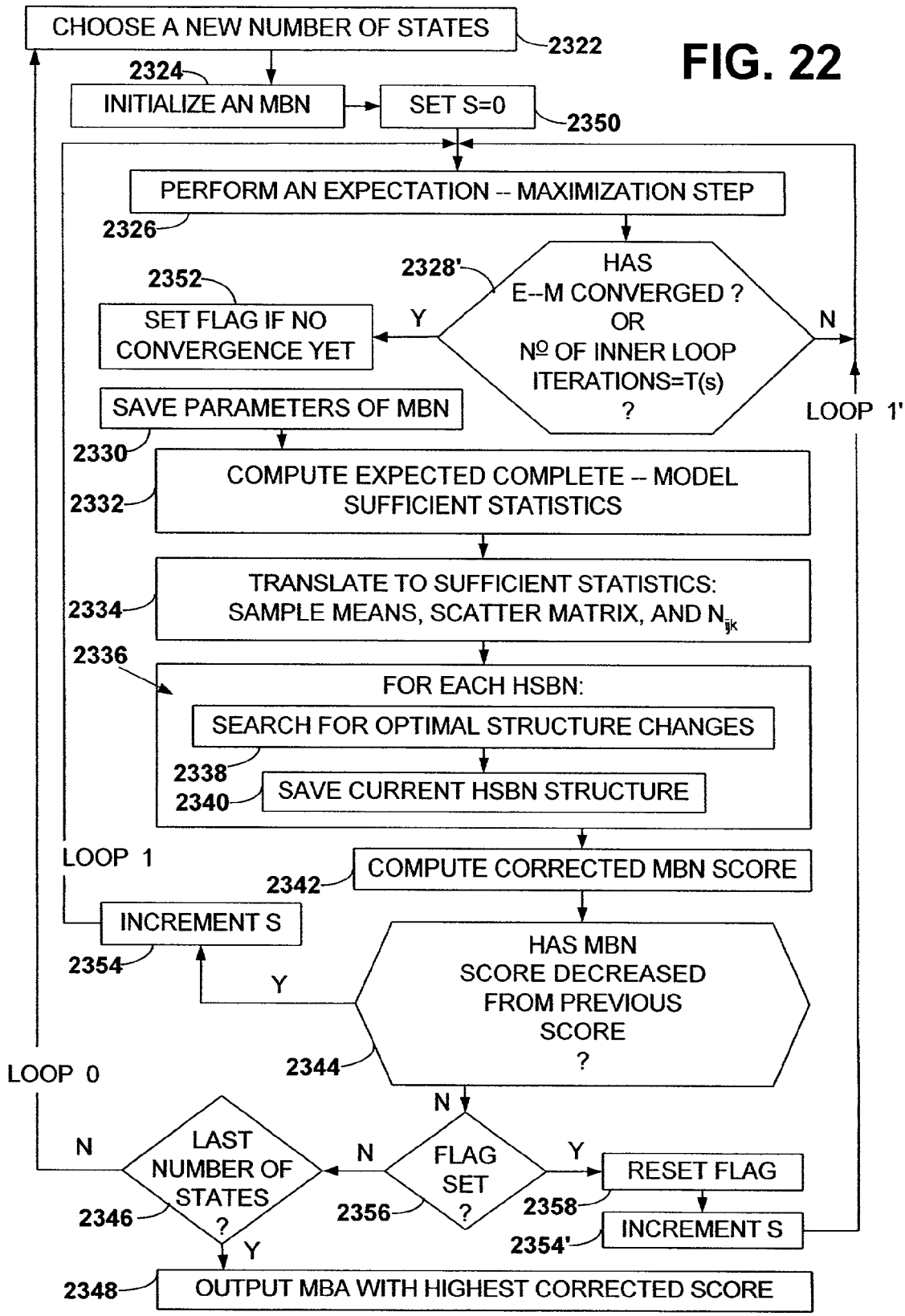
FIG. 22 illustrates a method of generating mixtures of Bayesian networks in accordance with a fourth aspect of the present invention.

FIG. 22 illustrates a modification of the embodiment of FIG. 21 in which the test for convergence at 2344 consists of determining whether the MBN score has decreased since a previous iteration of the middle loop (loop 1). If the MBN score has decreased, the loop 1 of FIG. 22 has converged and the methodology proceeds to 2354. Otherwise, if the score has not decreased at 2344, loop 1 has not converged and the process proceeds to 2356.

In carrying out a training process of FIG. 19, 20, 21, or 22, in accordance with an aspect of the present invention, the training data consists of visual observation vectors, each vector being associated with a predetermined character. Given the predetermined character for each visual observation vector, the performance of each HSBN is readily scored as required in the training process of FIG. 19, 20, 21, or 22. Basically, a search for optimal improvements in the probability parameters stored in each node and a search for structure modifications to the arcs are conducted, the two searches being interleaved as described above. The output of each HSBN and of each MBN is scored as required by evaluating it in light of the predetermined character using conventional inferencing techniques.

Figure 23:
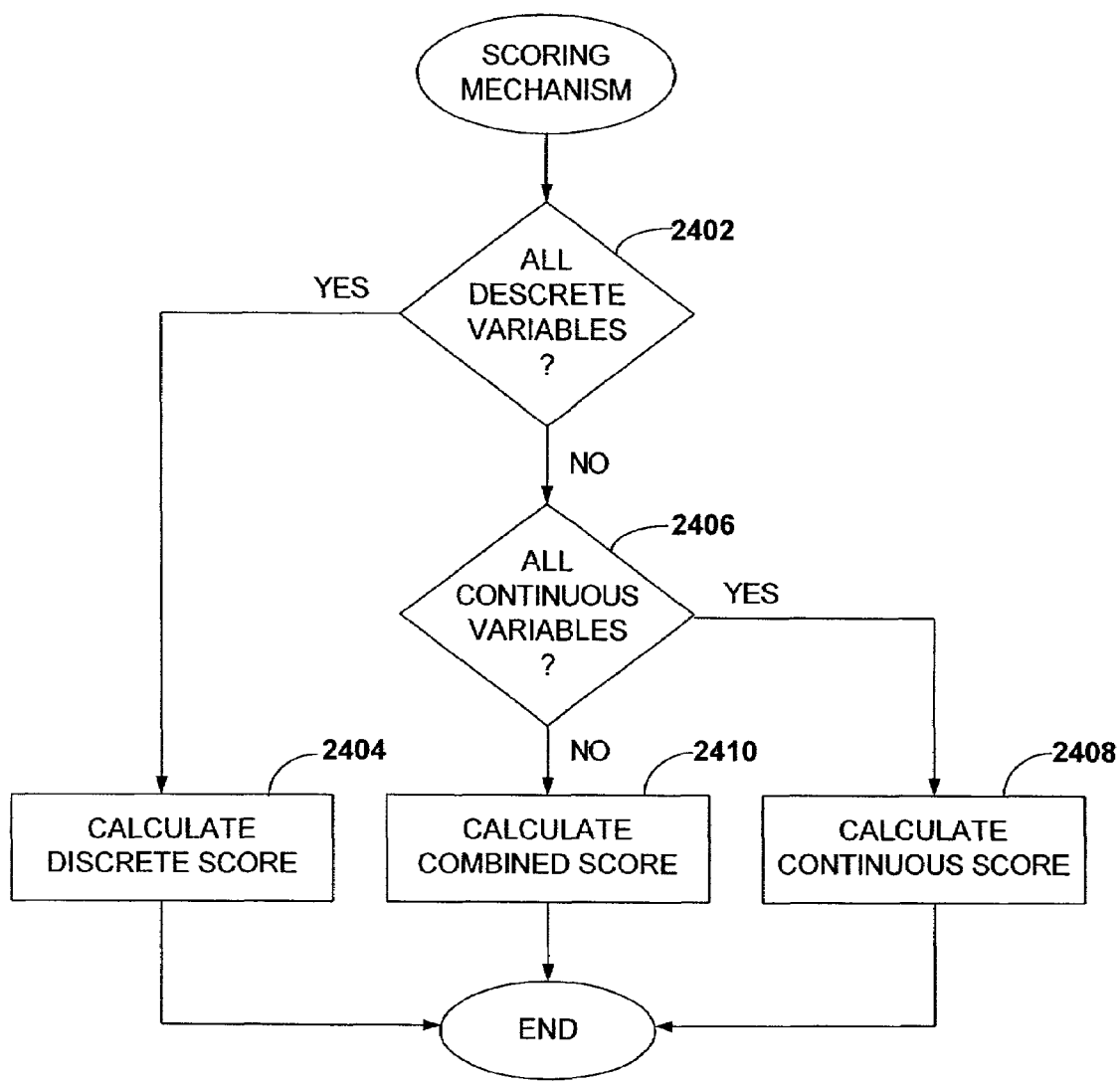
FIG. 23 is a high-level flow diagram illustrating a methodology for scoring mixtures of Bayesian networks in accordance with an aspect of the present invention.

FIG. 23 is a flow diagram illustrating a high level methodology for generating a score for variables in a test network, such as to perform the functionality of the scoring mechanism 1802 shown and described in FIG. 17. The methodology of FIG. 23 begins at 2402 with a determination as to whether a test network contains all discrete variables. If the test network contains all discrete variables, the methodology proceeds to 2404 generates a score for the nodes in a list of nodes of the test network by invoking the calculate discrete score process. However, if the determination at 2402 is negative, indicating that the test network does not contain all discrete variables, a determination is made a 2406 as to whether the test network contains all continuous variables. If the test network contains all continuous variables, a score is generated at 2408 (e.g., by the scoring mechanism 1802 of FIG. 17) for the nodes indicated in the list of nodes of the test network by invoking a calculate continuous score process. However, if the test network does not contain all continuous variables, the test network contains a combination of discrete and continuous variables ("a mixed network"), as indicated by a negative determination at 2406. Thus, at 2410, a score is generated for the nodes indicated by the list of nodes of the test network by invoking the calculate mixed score process.

The calculate discrete score process, the calculate continuous score process and the calculate mixed score process are based upon a common concept, Bayes' theorem. The score that each scoring process produces is proportional to the posterior probability of the test network. That is, probability distributions and densities can be of two types: prior and posterior. The prior probability distribution or density is the probability distribution or density before data is observed. The posterior probability distribution or density is the probability distribution or density after data is observed. Bayes' theorem states that the posterior probability of a test network is proportional to the prior probability of a test network multiplied by the probability of the empirical data database given the test network and the expert knowledge.

Calculate Discrete Score Process

The calculate discrete score process scores a test network containing all discrete variables. The calculate discrete score process takes advantage of the fact that the probability of the empirical data database given a test network and expert knowledge is the product over all cases of the probability of a particular case given a test network, expert knowledge, and previous cases (i.e., cases observed prior to the particular case). The computation of the probability of a case given a test network, expert knowledge, and previous cases is based on the assumption that the empirical data database represents a multinomial sample from the test network. That is, the empirical data database contains a sequence of observations that form a multinomial distribution as described in DeGroot, *Optimal Statistical Decisions* at 48–49 (1970). Thus, each variable given each instance of the parents of the variable is associated with a set of parameters $\{\theta_{ij1}, \ldots, \theta_{ijr_i}\}$, where:

i is the variable index, "i=1 . . . n," where "n" is the number of variables in the test network;

j is the parent-instance index; "j=1 . . . $q_i$," where $q_i$ is the number of instances of the parents;

k is the variable state index; "k=1 . . . $r_i$", where "$r_i$" is the number of states of the variable i.

The parameter $\theta_{ijk}$ is the long run fraction for $x_i$=k, when $\Pi_i$=j. That is, for all values of i,j, and k, $$p(x_i = k \mid \Pi_i = j, \theta_{ijk}, B_S^e, \xi) = \theta_{ijk},$$

where $$B_S^e$$

is the hypothesis-specific test network. In addition, the exemplary embodiment assumes that the density of each parameter set $\{\theta_{ij1}, \ldots, \theta_{ijr_i}\}$ has a Dirichlet distribution as defined by:

$$\rho(\theta_{ij1}, \ldots, \theta_{ijr_i} \mid B_S^e) = \frac{\Gamma\left(\sum_{k=1}^{r_i}(e_i)\right)}{\prod_{k=1}^{r_i}\Gamma(e_i)} \prod_{k=1}^{r_i} \theta_{ijk}^{e_i-1}, \; e_i > 0$$

where "$\Gamma(\;)$" is the Gamma function defined as $$\Gamma(x) = \int_0^\infty e^{-y} y^x \, dy.$$

The exponents $e_i$ are given by $K/(r_i q_i)$ where K is the sample size specified by the user. Alternatively, one may use $e_i$=1.

Figure 24:
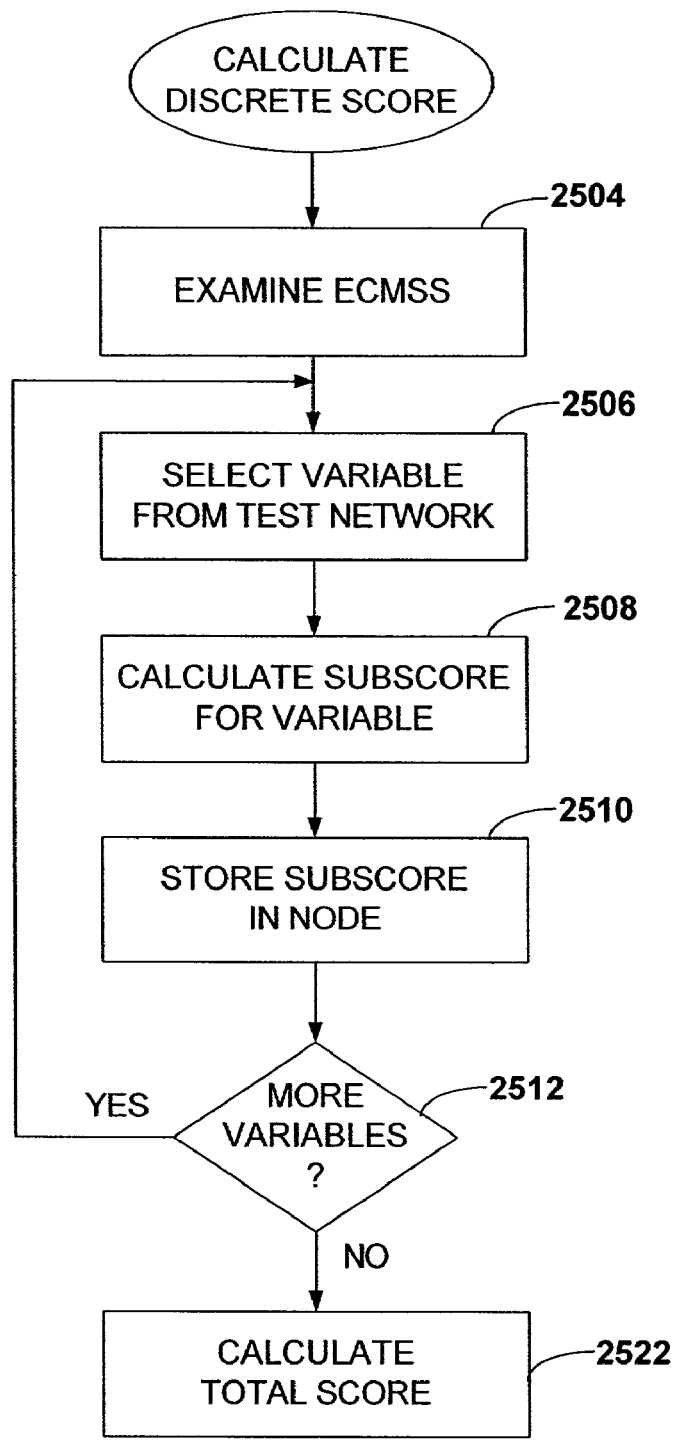
FIG. 24 is a flow diagram for calculating a score for discrete variables in accordance with an aspect of the present invention.

FIG. 24 is a flow diagram illustrating a calculate discrete score process in accordance with an aspect of the present invention. The methodology begins at 2504 with an examination of the translated expected complete-model sufficient statistics ECMSS_c for the number of times ("hits") that each variable is encountered, for each state of each variable, and for each possible instance of the parents of each variable. The number of hits, therefore, has three indices i, j and k; "i=1 ... n," where "n" is the number of variables in the test network; "j=1 ... $q_i$," where $q_i$ is the number of instances of the parents; and "k=1 ... $r_i$", where "$r_i$" is the number of states of variable i.

Next, at 2506, a variable is selected from the test network according to the list of nodes to score, starting with the first variable in the list of nodes. After a variable is selected, a subscore is calculated for the selected variable at 2508 and the calculated subscore is stored in the node of the test network that corresponds with the selected variable at 2510. The subscore for each variable $x_i$ is calculated, for example, using the following formula:

$$\log\left[\prod_{j=1}^{q_i} \frac{\Gamma(r_i e_i)}{\Gamma(N_{ij} + r_i e_i)} \prod_{k=1}^{r_i} \frac{\Gamma(N_{ijk} + e_i)}{\Gamma(e_i)}\right].$$

After the subscore for a variable is calculated and stored, the calculate discrete score process determines at 2512 if there are more variables to be processed. If the determination at 2512 indicates that there are more variables to process, the process returns to step 2506 to process more variables. If there are no more variables to process and after storing the subscores, a total score for the test network is generated at 2522, such as by adding all of the subscores together and adding the log prior probability of the HSBN structure given |C|.

Calculate Continuous Score Process

The calculate continuous score process calculates scores for test networks containing all continuous variables and is based on Bayes' theorem. The calculate continuous score process assumes that all cases in the empirical data database are drawn from a multivariate normal distribution. The calculate continuous score process takes advantage of the fact that a set of variables have a multivariate normal distribution if and only if each particular variable is an independent (univariate) normal distribution, when conditioned on the variables that precede the particular variable in some ordering:

$$p(x_1 \mid x_1 \ldots x_{i-1}) = n\left(m_i + \sum_{j=1}^{i-1} b_{ji}(x_j - m_j), 1/v_i\right).$$

The term $p(x_i|x_1 \ldots x_{i-1})$ denotes the density of a particular variable given all the variables before the particular variable in some ordering. The term $$n\left(m_i + \sum_{j=1}^{i-1} b_{ji}(x_j - m_j), 1/v_i\right)$$

contains "n" referring to a normal distribution having a mean "$m_i$", a variance "$v_i$" and coefficients "$b_{ji}$". "m", "v" and "b" are parameters of the normal distribution. The coefficient "$b_{ji}$" refers to the strength of the connection between the mean of a variable "$X_i$" and the value of the variables "$X_j$". Thus, $b_{ji}$ is equal to zero if and only if there is no arc from "$X_j$" to "$X_i$" in the test network. One skilled in the art would recognize that the coefficient "$b_{ji}$" is sometimes called a partial regression coefficient between "$x_i$" and "$x_j$". The multivariate normal distribution and the univariate normal distribution are well known in the field of statistics.

In addition, the calculate continuous score process is based on three assumptions. First, the calculate continuous score process assumes that the prior distributions for the mean and precision matrix of the multivariate normal distribution with all dependencies between variables being possible (i.e., $B_{sc}^e$) is the normal-Wishart distribution. The normal-Wishart distribution is described in DeGroot, *Optimal Statistical Decisions*, at 56–59 (1970). The normal-Wishart distribution is conjugate for multivariate normal sampling. Second, the parameters $E((v_1 b_1), \ldots, (v_n b_n))$ are mutually independent. Third, if $x_i$ has the same parents in two different Bayesian networks, then the prior densities of "v" and "b" of $X_i$ for both Bayesian networks are the same.

Figures 25A, 25B:
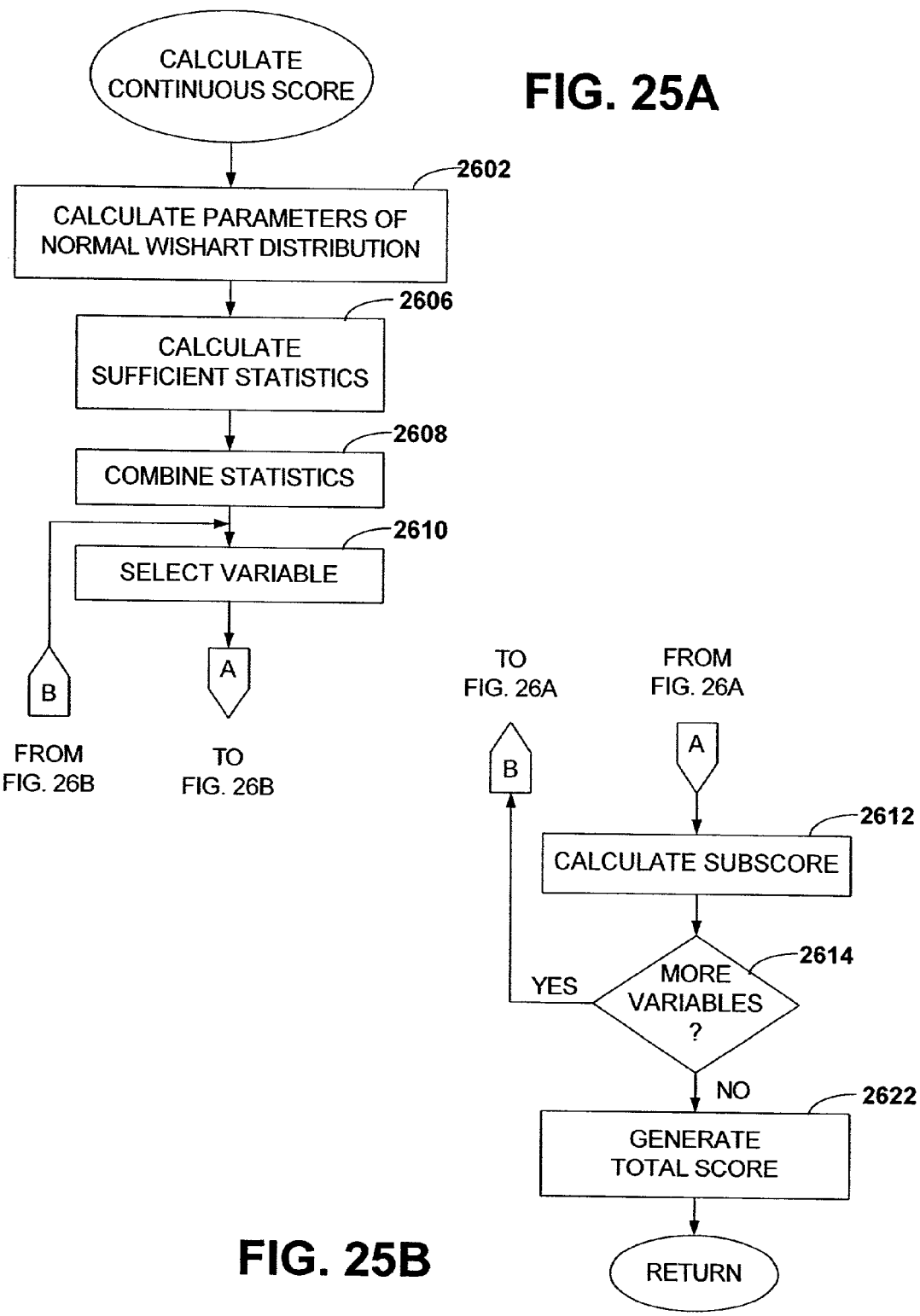
FIGS. 25A and 25B depict a flow diagram for calculating a score for continuous variables in accordance with an aspect of the present invention.

FIGS. 25A and 25B depict a flow diagram for a methodology performed by the calculate continuous score process in accordance with an aspect of the present invention. At 2602, the calculate continuous score process of the exemplary embodiment first calculates the parameters associated with the prior densities of the normal-Wishart distribution, such as follows:

$$T_0 = I$$
$$\vec{\mu}_o = <\vec{x}>$$

where "$T_0$" is the precision matrix of the normal-Wishart distribution (an n by n matrix), I is the identity matrix, "$\vec{\mu}_o$" is the prior mean of the normal-Wishart distribution (an n by 1 column matrix), and "$<\vec{x}>$" is the sample mean of the variables in the domain. Next, at 2606, sufficient statistics are calculated. For example, the sample mean and the multivariate internal scatter matrix are computed. For complex data, the sample mean can be defined by:

$$\bar{x}_m = \frac{1}{m}\sum_{i=1}^{m}\vec{x}_i$$

where "$\bar{x}_m$" refers to the sample mean, "m" is the number of complete cases in the database, and "$\vec{x}_i$" refers to a case. The multivariate internal scatter can be defined by:

$$S_m = \sum_{i=1}^{m}(\vec{x}_i - \bar{x}_m)(\vec{x}_i - \bar{x}_m)'$$

where "$S_m$" refers to the multivariate internal scatter matrix, where "$\vec{x}_i$" refers to a case, and where "$\bar{x}_m$" refers to the sample mean. The mark ' refers to the transpose in which the matrix is rearranged from being an "n by 1" to being a "1 by n" matrix, and multiplied together so as to render an "n by n" matrix.

Next, at 2608, the intermediate statistics obtained at 2602 and 2606 are combined. The combining, for example, can combine $T_0^{n \times n}$ (indicating that $T_0$ is an n by n matrix) with the multivariate internal scatter matrix and a term involving the sample mean and prior mean to create $T_m^{n \times n}$. Thus, at 2608, the following is computed:

$$T_m^{n \times n} = T_0^{n \times n} + S_m^{n \times n} + \frac{Km}{K+m}(\vec{\mu}_o - \bar{x}_m)(\vec{\mu}_o - \bar{x}_m)'$$

where "K" is the effective sample size specified by the user, "m" is the number of completed cases in the expected complete-model sufficient statistics ECMSS_c, "$T_0$" is the precision matrix of the prior normal-Wishart distribution, "$\vec{\mu}_o$" is the prior mean of the normal-Wishart distribution, and "$\bar{x}_m$" is the sample mean.

At 2610, one variable from the list of nodes to be scored is selected at 2610. After selecting one variable, the score process proceeds to 2612 (FIG. 25B) to calculate a subscore ("the complete data subscore") for that variable. The complete data subscore is also stored into the node at 2612). The subscore for one variable can be calculated, for example, by performing the following:

$$\text{subscore}[i] = \log\left[p(B_s^e(i)|\xi)\frac{p(D^{x_i \Pi_i}|B_s^e)}{p(D^{\Pi_i}|B_s^e)}\right].$$

The term "$p(B_s^e(i)|\xi)$" probability of the variable-parent pair $x_i$-$\Pi_i$. Both terms in the fraction can be computed using:

$$p(D^R|B_{sc}^e) = (2\pi)^{-nm/2}\left(\frac{K}{K+m}\right)^{n/2}\frac{c(n, K+n)}{c(n, K+n+m)}|T_0|^{(K+n)/2}|T_m|^{-\frac{K+n+m}{2}}.$$

The term "$p(D^R|B_{sc}^e)$" refers to the density of the data restricted to the set of variables R given the event indicated by the prior network $B_{sc}^e$, where "n" is the number of variables in R, "K" is the effective sample size specified by the user, "m" is the number of completed cases in the ECMSS_c, "$|T_0|$" is the determinant of $T_0$ marginalized to the variables in R, "$|T_m|$" is the determinant of $T_m$ marginalized to the variables in R, and c(n,K) is the Wishart normalization function defined as:

$$c(n, K) = \left\{2^{Kn/2}\pi^{n(n-1)/4}\prod_{i=1}^{n}\Gamma\left(\frac{K+1-i}{2}\right)\right\}^{-1}.$$

The determinant of an n by n matrix (A) is the sum over all permutations $p=(i_1 \ldots i_n)$ of the integers 1 through n of the product:

$$(-1)^{k_p}\prod_{j=1}^{n}A[j, i_j]$$

where $k_p$ is 0 if P is even and $k_p$ is 1 if P is odd.

After the calculate continuous score process of the exemplary embodiment calculates a subscore for one variable, a determination is made at 2614 as to whether there are more variables to be processed. If there are more variables in the list of nodes for processing, the process returns to 2610. However, if there are no more variables for processing in the test network, the process proceeds to 2622. At 2622, the process calculates and generates a total score, such as by adding all the subscores together and adding the log prior probability of the hypothesis-specific network structure given |C|.

Calculate Mixed (Discrete and Continuous) Score Process

The calculate mixed score process is programmed and/or configured to calculate a score for a mixed network having both discrete and continuous variables in accordance with an aspect of the present invention. The calculate mixed score process is based on Bayes' theorem. In calculating a score for a mixed network, process enforces a restriction that the initial network be constructed under the assumption that all dependencies among variables are possible. This restriction, for example, is enforced by the knowledge engineer. The calculate mixed score process also follows a restriction that the prior network and all mixed test networks correspond to a collection of conditional Gaussian distributions. This restriction is enforced by the knowledge engineer and the network adjuster, respectively.

In the following discussion of FIG. 26, the symbols $\Gamma$, $\Delta$, $\Gamma_i$ and $\Delta i$ appearing above in this specification are employed here, but have a different meaning. For the domain of all variables in a mixed network to be a collection of conditional Gaussian distributions, the set of continuous variables "$\Gamma$" and the set of discrete variables "$\Delta$" must be divisible into disjoint sets $\Gamma_1 \ldots \Gamma\gamma$ such that for each set $\Gamma_i$ there exists a $\Delta_i$ subset of $\Delta$ such that $\Gamma_i$ is connected with respect to continuous variables, $\Gamma_i$ and $\Gamma_j$ ($i \neq j$) is not connected with respect to continuous variables, no continuous variable is the parent of a discrete variable, and $\Delta_i$ is a minimal set such that $\Gamma_1$ and $\Delta$ are conditionally independent given $\Delta_i$.

Figure 26:
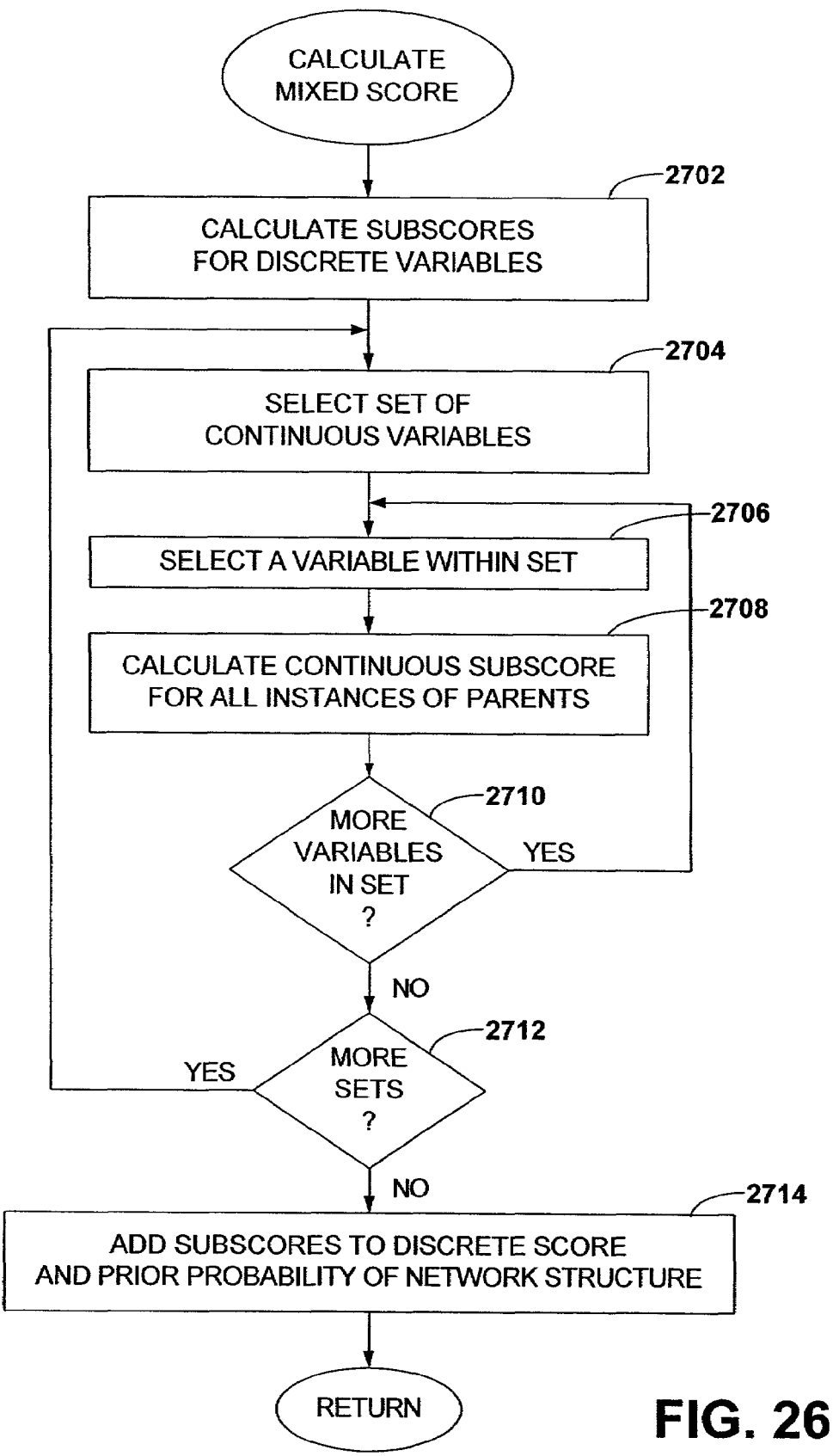
FIG. 26 depicts a flow diagram for calculating a score for a mixture of discrete and continuous variables in accordance with an aspect of the present invention.

FIG. 26 is a flow diagram illustrating a process for calculating a mixed score in accordance with an aspect of the present invention, such as can be performed by the calculate combined score process 2410, shown and described with respect to FIG. 23. The effect of the calculate mixed score process shown in FIG. 26 is that, first, the discrete variables are scored. Then, for each subset $\Delta_i$ and for each instance of subset $\Delta_i$, the scores for the continuous variables in $\Gamma_i$ are calculated and added. Lastly, the log prior probability for the HSBN is added to the score.

The process begins at 2702 in which the subscore for all discrete variables in the list of nodes to be scored is calculated. For example, the calculate mixed score process performs this by invoking the calculate discrete score process on the test network restricting the nodes scored to only the discrete nodes. Next, at 2704, a set of continuous variables "$\Gamma_i$" from the list of nodes to be scored is selected (e.g., by the calculate mixed score process). At 2706, a variable within "$\Gamma_i$" is selected for processing. After selecting a variable, at 2708, a continuous subscore for the selected continuous variable for all instances of the parents of the variable is calculated. In calculating the continuous subscore for a mixed network, since the mixed network is divided into sets of nodes, the definitions for K, $\mu_0$, and $T_0$, as described relative to the calculate continuous score process are redefined as a function of i and j (the instance of $\Delta_i$).

$$K_{ij} = K/q_i$$

$$\vec{\mu}_{ij} = \langle \Gamma_i | \Delta_i = j \rangle$$

$$T_{ij} = I$$

where "$q_i$" is the number of parents of $\Gamma_i$, and "$\Delta_i$" are as defined above "$\vec{\mu}_{ij}$" is redefined as the sample mean of variables "$\Gamma_i$" given the discrete parents of "$\Gamma_i$" that equal configuration j. Alternatively, each effective sample size $K_{ij}$ may be specified by the user.

After calculating the continuous subscores at 2708, the process proceeds to 2710 in which a determination is made as to whether there are more variables in the selected set for processing. If there are more variables to be processed, processing continues to step 2706. However, if there are no more variables to be processed, processing continues from 2710 to 2712, wherein a determination is made as to whether there are more sets of continuous variables to be processed. If, at 2712, there are more sets of continuous variables to be processed, then processing returns to 2704. However, if there are no more sets of continuous variables to be processed, then the calculate mixed score process proceeds from 2712 to 2714.

At 2714, the calculate mixed score process adds the discrete subscores, the continuous subscores and the log prior on the HSBN structure together. In view of the foregoing, it is to be appreciated that 2704 through 2714 of the process of FIG. 24 can be described according to the following formula:

$$\text{score}(B_s^e) = \log p(B_s^e \| C|) + \log p(D^\Delta | B_s^e) + \sum_{k=1}^{\gamma} \sum_{j=1}^{q_\lambda} \sum_{i=1}^{n} \log \frac{p(D^{x_i \Pi_i} | \Delta_k = j, B_s^e)}{p(D^{\Pi_i} | \Delta_k = j, B_s^e)}$$

where "$\log p(B_s^e)\|C|)$" refers to the log prior on structure $B_s^e$ given |C|, the term "$\log p(D^\Delta|B_s^e)$" refers to the score for the discrete variables in the test network, and $q_k$ is the number of configurations of $\Delta_l$. In addition, the term, $$\sum_{k=1}^{\gamma} \sum_{j=1}^{q_\lambda} \sum_{i=1}^{n} \log \frac{p(D^{x_i \Pi_i} | \Delta_k = j, B_s^e)}{p(D^{\Pi_i} | \Delta_k = j, B_s^e)}$$

refers to the score for the continuous variables wherein the term "$D^{x_i \Pi_i}$" refers to the data restricted to variables $\{X_i\} \cup \Pi_i$.

Network Adjuster

FIGS. 27A and 27B are a flow diagram illustrating a methodology to adjust the network structure in accordance with an aspect of the present invention, such as performed by the network adjuster 1804 shown in FIG. 17.

The network adjuster process begins at 2802 by selecting a node within the test network for processing, such as according to the test network stored on the last invocation of the network adjuster (or a newly created initial network). Next, at 2804, the network adjuster then performs all legal single changes on the selected node. For example, the network adjuster in sequence: (1) adds an arc to the selected node from each other node (not already directly connected) as long as the new arc does not introduce a directed cycle, (2) deletes each arc pointing to the selected node, and (3) reverses each arc pointing to the selected node as long as the modified arc does not introduce a directed cycle. In addition, if the test network is a mixed network, the network adjuster process can ensure that the test network remains conditional Gaussian.

At 2806, the network adjuster process requests the scoring mechanism to generate new subscores for each legal change for the affected nodes. The affected nodes are the nodes at either end of an arc change. Because the data has been completed so that there is no missing data, the exemplary embodiment can perform changes on a node-by-node basis because the subscores of each variable obtained for the discrete variable networks, the continuous variable networks, and the mixed networks, are logically independent. In other words, the score is said to be factorable. Therefore, because the score is factorable, if the subscore for the affected nodes improves, it can be ensured that the entire score will improve. The subscores are generated using the calculate discrete score process, the calculate continuous score process, or the calculate mixed score process, depending on the type of the test network. After calculating the new subscores at 2806, the network adjuster then selects the change that produces the best subscore for the affected nodes at 2808.

After the best change for the selected nodes has been identified, the network adjuster determines at 2810 whether there are more variables in the test network for processing. If there are more variables in the test network for processing, the network adjuster returns to 2802 wherein the next variable (e.g., node) in the test network is selected for processing according to the foregoing process. If there are no more nodes with variables to be processed, the process proceeds from 2810 to 2812 of FIG. 27B.

At 2812, a determination is made as to whether the selected change has improved the overall score of the network. Thus, after all of the variables have been processed, the network adjuster identifies the change of the best changes selected from step 2808 that most improves the total score of the test network. If there is such a change, then the network adjuster stores the test network and the subscores for the affected nodes, and then returns to step 2802. If no change exists that improves the total score, then the network adjuster returns the current test network as the improved Bayesian network, such as the MBN 1816 of FIG. 17.

What has been described above includes examples of the present invention. It is, of course, not possible to describe every conceivable combination of components or methodologies for purposes of describing the present invention, but one of ordinary skill in the art will recognize that many further combinations and permutations of the present invention are possible. Such changes may include parallelization of some of the computations described herein or the use of other probability distributions, for example. Accordingly, the present invention is intended to embrace all such alterations, modifications and variations that fall within the spirit and scope of the appended claims.

What is claimed is:

1. A handwritten character recognition network for inferring parts of handwriting from visual observations with a common hidden variable having plural discrete states, comprising:

at least one mixture of Bayesian networks (MBN) that encodes probabilities of observing the visual observations corresponding to a handwritten character, the probabilities employed for inferring parts of handwriting;

the MBN comprising:

a plurality of hypothesis-specific Bayesian networks (HSBNs), each of the HSBNs encoding probabilities of observing the visual observations corresponding to a handwritten character and given the common hidden variable being in a respective one of its states;

a first aggregator that combines outputs of the HSBNs to produce an MBN output of the MBN;

each one of the HSBNs comprises:
plural nodes, each of the plural nodes corresponding to an associated visual observation element, and at least some of the plural nodes having dependencies with others of the plural nodes within the one HSBN, a second aggregator connected to outputs of the nodes of the one HSBN to provide the output of the one HSBN, the nodes having inputs that receive the state of a respective one of the visual observation elements of a current one of the visual observations.

2. The handwriting recognition network claim 1, at least one node of the plural nodes storing probability parameters that correspond to a relationship between the visual observation element of the at least one node and the visual observation element of at least one other of the nodes in the respective HSBN.

3. The handwriting recognition network of claim 1, at least one node of the plural nodes of a respective HSBN storing probability parameters that define how a respective state of the associated visual observation element depends on the respective handwritten character for the respective MBN.

4. The handwriting recognition network of claim 3, the visual observation elements further comprising a number of start-stop features associated with the beginning and end of at least one character stroke for the respective character.

5. The handwriting recognition network of claim 4, the number of start-stop features comprising 4*k, where k is the number of character strokes for the respective character, the common hidden variable having a fixed predetermined number of the states.

6. The handwriting recognition network of claim 5, the visual observation elements further comprising at least one mid-point features associated with part of the character stroke between the beginning and end of at least some of the character strokes.

7. The handwriting recognition network of claim 4, the visual observation elements further comprising curvature features associated with part of the at least some of the character strokes, the common hidden variable having a fixed predetermined number of states.

8. The handwriting recognition network of claim 4, the number of states for the common hidden variable being functionally related to the number of training examples for the respective character.

9. The handwriting recognition network of claim 8, the number of states for the common hidden variable being 2 for 1 to 300 training examples, 3 for 301 to 1000 training examples, 4 for 1001 to 3000 training examples, 5 for 3001 to 5000 training examples, and the number of training examples divided by one-thousand for more than 5000 training examples, with a maximum of 10 states.

10. The handwriting recognition network of claim 3, the probability parameters in different ones of the HSBNs differ to reflect different states of the common external hidden variable represented by the different ones of the HSBNs.

11. The handwriting recognition network of claim 1, the one HSBN having a restricted structure in which no node associated with a visual observation element for a character stroke is dependent on another node associated with a visual observation element of an earlier character stroke of the respective handwritten character.

12. The handwriting recognition network of claim 1, further comprising a system for performing character completion according to a set of MBN arrays selected as a function of the number character strokes in an input handwritten character of the visual observation.

13. The handwriting recognition network of claim 12, the system for performing character completion restricting each of the HSBNs so that no node associated with a visual observation element for a character stoke is dependent on another node associated with a visual observation element of an earlier character stroke of the input handwritten character.

14. The handwriting recognition network of claim 1, the common hidden variable being external in that the common hidden variable is not represented by any of the nodes in the mixture of Bayesian networks.

15. The handwriting recognition network of claim 1, each HSBN being associated with an HSBN score, and:
each of the HSBNs further comprises an inference input defining observed data corresponding to the visual observations and an inference output corresponding to the likelihood of an visual observation corresponding to a handwritten character and given the common hidden variable being in one of its states corresponding to the HSBN; and the mixture of Bayesian networks further comprises a weight multiplier which weights the inference output of each HSBN by a corresponding HSBN score and combines the weighted HSBN inference outputs into a single inference output of the mixture of Bayesian networks.

16. The handwriting recognition network of claim 15, the HSBN score corresponding to the likelihood of the common hidden variable being in the corresponding one of the states of the common hidden variable.

17. The handwriting recognition network of claim 16, the HSBN score reflects the goodness of the corresponding HSBN at predicting observed data representing states of the observed variables.

18. The handwriting recognition network of claim 17, the HSBN score is computed by the mixture of Bayesian networks.

19. The handwriting recognition network of claim 1, the number of the HSBNs in the MBN is selected to optimize the goodness of the mixture of Bayesian network at predicting observed data representing states of the observed variables.

20. The handwriting recognition network of claim 19, the number of HSBNs in the MBN corresponds to the number of states of the common hidden variable for the respective MBN.

21. The handwriting recognition network of claim 1, the plurality of nodes of different ones of the HSBNs represent the same set of hidden and observed variables.

22. A handwriting recognition system, comprising:
means for encoding probabilities of observing sets of visual observations for a predetermined character;
the means for encoding comprising plural means for modeling a hypothesis that a common hidden variable corresponding to a handwritten character associated with the means for encoding is in a respective one of a plurality of discrete states;
each of the means for modeling comprising plural means for storing probability parameters that define relationships between visual features of the handwritten character;

at least some of the means for storing having dependencies with others of the means for storing in each respective means for modeling;

each means for modeling further comprising means for aggregating outputs from the plural means for storing and providing outputs of each respective means for modeling; and means for aggregating the outputs of the respective means for modeling to produce a corresponding output of each respective means for encoding indicative of the probability that an input visual observation corresponds to the handwritten character defined by the common hidden variable.

23. A system for training a mixture of Bayesian networks (MBN), comprising:

the mixture of Bayesian network comprising a plurality of hypothesis-specific Bayesian networks (HSBNs), each of the HSBNs modeling a hypothesis that a common hidden variable corresponding to a handwritten character associated with the MBN is in a respective one of a plurality of discrete states;

each of the HSBNs comprising a plurality of nodes that correspond to visual features of the handwritten character, each one of the plurality of nodes in a respective HSBN storing probability parameters that indicate how a visual feature of the one node depends on the handwritten character;

a parameter search component that identifies a set of changes in the probability parameters that improve the goodness of each of the HSBNs in predicting visual observations of the handwritten character;

a parameter modification component that modifies the probability parameters based on the identified set of changes;

a scoring system that computes a structure score for each HSBN in the MBN that reflects the goodness of the each respective HSBN in predicting visual observations according to a structure of each HSBN;

a network adjuster that searches for changes in dependencies between nodes of each HSBN that improve the structure score and modifies the dependencies so as to improve the structure score.

24. The system of claim 23, the parameter modification component and the network adjuster cooperating for each HSBN so as to interleave the search for changes in the probability parameters and the changes in the dependencies among the nodes.

25. A method of training a mixture of Bayesian networks (MBN) to facilitate recognition of handwritten characters, the MBN encoding probabilities of observing the sets of visual observations corresponding to a handwritten character and comprising a plurality of hypothesis-specific Bayesian networks (HSBNs), each HSBN including a plurality of nodes having probability parameters with dependencies between at least some of the nodes to model a hypothesis that a common hidden variable corresponding to a handwritten character is in a respective one of a plurality of discrete states, the method comprising:

for each one of the HSBNs:
conducting a parameter search for a set of changes in the probability parameters which improves the goodness of the one HSBN in predicting the visual observations, and
modifying the probability parameters of the one HSBN accordingly; and for each one of the HSBNs:
computing a structure score of the one HSBN reflecting the goodness of the one HSBN in predicting the visual observations,
conducting a structure search for a change in the causal links which improves the structure search score, and
modifying the causal links of the one HSBN based on the structure search.

26. The method of claim 25, the computing a structure score of the one HSBN further comprises:
computing expected complete model sufficient statistics (ECMSS) based on the visual observations;
computing sufficient statistics for the one HSBN based on the ECMSS; and
computing the structure score based on the sufficient statistics.

27. The method of claim 26, the plurality of nodes in the one HSBN further comprising discrete hidden and observed variables having respective states, the computing the ECMSS further comprising:
computing the probability of each combination of states of discrete hidden and observed variables of the nodes of the one HSBN;
forming a vector for each observed case in the set of visual observations, each entry in the vector corresponding to a particular one of the combinations of the states of the discrete variables; and
summing the vectors over plural cases of the visual observations.

28. The method of claim 27, at least some of the plurality of nodes in the one HSBN further comprising continuous variables, each entry in the vector is formed to have plural sub-entries comprising:
(a) the probability of the one combination of the states of the discrete variables,
(b) sub-entry vectors representing the states of the continuous variables.

29. The method of claim 28, further comprising computing by inference in the MBNs the probability of the one combination of the states of the discrete variables.

30. The method of claim 28, wherein each of the plural sub-entries is formed such that the sub-entry vector has a vector multiplier corresponding to the probability of the one combination of the states of the discrete variables.

31. The method of claim 30, the computing sufficient statistics based on the ECMSS comprises computing from the ECMSS at least one of the following:
(a) mean,
(b) scatter,
(c) sample size.

32. The method of claim 25, the conducting a parameter search and the modifying the probability parameters are repeated consecutively until a parameter search convergence criteria is met.

33. The method of claim 32, further comprising:
repeating the conducting a parameter search, the computing the structure score and the conducting a structure search until a structure search convergence criteria is met.

34. The method of claim 33, the parameter search convergence criteria is a determination of whether the parameter search has converged at a local optimum.

35. The method of claim 33, the parameter search convergence criteria is a determination of whether the parameter search has been repeated a number of times.

36. The method of claim 35, the number of times is a set number.

37. The method of claim 35, the number of times is a function of the number of times the structure search has been repeated for the one HSBN.

38. The method of claim 35, the parameter search convergence criteria limits the repetition of the parameter search to a limited number of repetitions and the parameter search is repeated after convergence of the structure search.

39. The method of claim 33, the structure search convergence criteria comprises a determination of whether the structure score has worsened since a prior repetition of the structure search step.

40. The method of claim 33, the structure search criteria comprises a determination of whether a current performance of the structure search has changed any of the dependencies in the one HSBN.

41. The method of claim 35, further comprising repeating the parameter search when conducting a structure search results in a change in the structure of the one HSBN.

42. The method of claim 41, the conducting of each of the parameter search and the structure searching being repeated either a fixed number of times or until an associated convergence criteria is met.

43. The method of claim 41, the parameter search is repeated by a number of times functionally related to the number of times the structure search has been repeated.

44. The method of claim 25, further comprising:
repeating the conducting a parameter search, the computing the structure score and the conducting a structure search until a structure search convergence criteria is met.

45. The method of claim 25, the conducting a structure search further comprises:
attempting different modifications of the dependencies at each node of the one HSBN;
for each one of the different modifications, computing the structure score of the one HSBN; and
saving those modifications providing improvements to the structure score.

46. The method of claim 25, further comprising computing a combined score of the MBN from the structure scores of computed for each of the plurality of HSBNs.

47. The method of claim 46, further comprising choosing a different number of states of the discrete hidden and observed variables and repeating the parameter and the structure search steps to generate a different MBN and scores thereof for the different numbers of states of the discrete variables.

48. The method of claim 47, further comprising choosing the MBN having the highest score.

49. The method of claim 47, further comprising weighting inference outputs of the different mixtures of Bayesian networks in accordance with their individual scores.

50. The method of claim 25, further comprising repeating the conducting of the parameter search and the conducting of the structure search and interleaving repetitions of the parameter search and the structure search.

51. The method of claim 25, further comprising initializing each of the HSBNs by
(a) defining a causal link from each node corresponding to a hidden variable to each node corresponding to a continuous observed variable; and
(b) initializing the probability parameters in each of the nodes.

52. The method of claim 51, each of the plurality of nodes in the one HSBN corresponding to a character completion characteristic of the handwritten character, the method further comprising enforcing a restriction that no node is dependent on another node in the one HSBN that is associated with a character completion characteristic of an earlier character stroke of the handwritten character.

53. The method of claim 25 wherein the step of performing the parameter search comprises searching for a change in the probability parameters in each node which improves the performance of the one HSBN in predicting the visual observations.

54. The method of claim 25, the common hidden variable is a common external discrete hidden variable not represented by any node in the MBN, the number of HSBNs in the MBN is equal to the number of states of the common external discrete hidden variable.

55. The method of claim 25, further comprising, for each HSBN, determining an optimum number m of HSBNs in the MBN, whereby m can be different for each MBN.

56. A computer-readable medium storing computer-executable instructions for performing the method of claim 25.

57. A system for inferring a handwritten character from visual observations, comprising:
mixtures of Bayesian networks (MBNs), each MBN encoding the probabilities of the visual observations associated with a handwritten character, the probabilities employed for inferring parts of handwriting, each of the MBNs associated with a common hidden variable;
each of the MBNs comprising a plurality of hypothesis-specific Bayesian networks (HSBNs) that model a hypothesis that the common hidden variable corresponding to a handwritten character is in a respective one of a plurality of discrete states, the common hidden variable is a common external hidden variable not included in any of the HSBNs.

58. The system of claim 57, each of the HSBNs further comprising a plurality of nodes, each of the nodes in a respective one of the HSBNs corresponding to an associated visual observation element of the handwritten character, at least some of the nodes in a respective one of the HSBNs having dependencies with others of the nodes in the one HSBN.

59. The system of claim 58, at least one node of the one HSBN storing probability parameters that define how a respective state of the associated visual observation element depends on the handwritten character.

60. The system of claim 58, the visual observation elements further comprising at least one character completion characteristics associated with at least one character stroke of the handwritten character.

61. The system of claim 58, the number of HSBNs in the MBN is equal to the number of states of the common hidden variable.

* * * * *